(12) United States Patent
Ise et al.

(10) Patent No.: US 6,336,129 B1
(45) Date of Patent: Jan. 1, 2002

(54) PACKET TRANSFER METHOD AND NODE DEVICE USING RESOURCE RESERVATION OR PRIORITY TRANSFER CONTROL WITHOUT REQUIRING VIRTUAL CONNECTION MERGING

(75) Inventors: Kotaro Ise; Yasuhiro Katsube, both of Kanagawa (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/205,232

(22) Filed: Dec. 4, 1998

(30) Foreign Application Priority Data

Dec. 5, 1997 (JP) .................................................. 9-335905

(51) Int. Cl.⁷ ...................................................... G06F 15/16
(52) U.S. Cl. ............................ 709/201; 709/200; 709/203; 709/205; 709/213; 709/238; 370/235; 370/397; 370/400; 370/409
(58) Field of Search ................................... 709/200–205, 709/213, 223, 227–228, 232, 238–240, 244–245; 370/395–401, 409, 235

(56) References Cited

U.S. PATENT DOCUMENTS

| | | | | |
|---|---|---|---|---|
| 5,557,611 A | * | 9/1996 | Cappellarl et al. | 370/395 |
| 5,734,652 A | * | 3/1998 | Kwok | 370/395 |
| 5,862,329 A | * | 1/1999 | Aras et al. | 709/204 |
| 5,892,924 A | * | 4/1999 | Lyon et al. | 709/245 |
| 5,920,705 A | * | 7/1999 | Lyon et al. | 709/240 |
| 6,041,037 A | * | 3/2000 | Nishio et al. | 370/228 |
| 6,055,561 A | * | 4/2000 | Feldman et al. | 709/200 |
| 6,094,431 A | * | 7/2000 | Yamato et al. | 370/395 |
| 6,167,051 A | * | 12/2000 | Nagami et al. | 370/397 |
| 6,185,213 B1 | * | 2/2001 | Katsube | 370/397 |

OTHER PUBLICATIONS

R. Braden et al., "Resource ReSerVation Protocol (RSVP)— Version 1 Functional Specification", Internet RFC 2205, Sep. 1997, pp. 1–112.

A. Viswanathan et al., "Soft State Switching: A proposal to extend RSVP for switching RSVP flows", IETF Draft, Aug. 1997, pp. 1–13.

\* cited by examiner

*Primary Examiner*—Zarni Maung
*Assistant Examiner*—Bharat Barot
(74) *Attorney, Agent, or Firm*—Foley & Lardner

(57) ABSTRACT

A packet transfer method at a node device in which the virtual channel merging is unnecessary at the label switch router even when the communication resource reservation or the high priority transfer is requested is disclosed. At each node, one or more virtual channels for a specific flow are set up toward all receivers regardless of whether each receiver requested a communication quality for the specific flow or not, upon receiving a message used in a procedure for reserving the communication quality for the specific flow that is transmitted from an upstream side to a downstream side on a route of the specific flow toward the receivers. Else, at each node, one virtual channel for a specific flow is set up toward at least one receiver, and transmitting messages indicating a need to set up virtual channels for the specific flow toward other receivers on a downstream side, upon receiving a message for requesting a communication quality for the specific flow that is transmitted from that at least one receiver to the sender toward an upstream side, such that a separate virtual channel set up procedure for setting up virtual channels for the specific flow toward the other receivers is activated among nodes on a route of the specific flow. Then, at each intermediate node, a transfer processing at a layer lower than a network layer is carried out according to a corresponding among the virtual channels.

20 Claims, 12 Drawing Sheets

FIG.2

| INPUT VC (LINK, VPI, VCI) | OUTPUT VC (LINK, VPI, VCI) | RESERVED BANDWIDTH [Mbps] |
|---|---|---|
| (0, 10, 32) | (1, 11, 33) | 0 |
| (1, 12, 34) | (2, 13, 35)<br>(3, 14, 36) | 1,5<br>0 |

PACKET TRANSFER METHOD AND NODE DEVICE USING RESOURCE RESERVATION OR PRIORITY TRANSFER CONTROL WITHOUT REQUIRING VIRTUAL CONNECTION MERGING

BACKGROUND OF THE INVENTION

1. Field of the Invention

The present invention relates to a packet transfer method and a node device for providing a constant level of communication quality in a packet communication network.

2. Description of the Background Art

In the packet communication network such as IP (Internet Protocol) network, for example, a router determines an output link by searching through a routing table at a time of packet transfer. This routing table search requires a relatively large processing amount so that it tends to be the bottleneck in improving the router speed.

In order to resolve this bottleneck, there are propositions of a new packet transfer schemes. For example, in the router called CSR (Cell Switch Router), one VC (Virtual Connection) of ATM or the like is provided for each group of packet flows that are to be transferred by the same route and a correspondence between that VC and the packet flows that flow through there is notified to neighboring CSRs (this operation will be referred to as a protocol for VC set up). The cells from the input VC can be sent to the output VC without reassembling them into IP packets, by storing the correspondence between the input VC and the corresponding output VC for each packet flow. Hereafter, this packet transfer will be referred to as the cut-through transfer. In this cut-through transfer, there is no need to search out the output link for each IP packet from the routing table so that it is possible to realize a high speed packet transfer.

Also, in the router called LSR (Label Switch Router), a value called label is written between an IP packet header and a datalink packet header, for instance, where different labels are used for different packet flows that share the same route, even in the case of using the connectionless datalink media such as Ethernet. The LSR can determine the output link and the output label value from the label value of the received packet, by storing a correspondence between the input label and the corresponding output label value and output link. In this way, similarly as in the CSR, the IP packet transfer is carried out without the IP processing such as IP routing table search. Namely, in the LSR, a virtual channel is set up even in the connectionless datalink media by using the label, and the packet transfer without the Ip processing is carried out according to an identifier (that is the label) of this virtual channel. Hereafter, a path through which the packet is transferred without the IP processing by using the label will be referred to as an LSP (label Switched Path).

Now, an exemplary case of using ATM as the datalink layer media used in the LSR will be described, but as already mentioned above, it is possible to set up a virtual channel by using the concept of the label even in the case of using the connectionless data link media such as Ethernet, so that the same description as in the case of ATM also holds in such a case.

When the flow is defined as a group of packets which have the same set of (destination address, destination port number, protocol number, source address, source port number), the LSR sets up one VC with respect to a group of flows which share the same route. For example, one VC is set up for the purpose of transferring flow groups which have the same set of (destination address, source address). In this way, it is possible to reduce the necessary number of VCs than the case of setting up one VC for each flow. Else, by setting up one VC for the purpose of transferring flow groups which have the same set of (destination network address, source network address), it is possible to reduce the necessary number of VCs further. Else, it is also possible to set up one VC for the purpose of transferring flow groups which have the same edge router as an ingress node of some domain and the same destination network address, or to set up one VC for the purpose of transferring flow groups which have the same edge routers as ingress and egress nodes of some domain.

Here, an exemplary case of the cut-through transfer with respect to the multicast flow will be described with reference to FIG. 8.

FIG. 8 shows a situation in which a transmitting terminal 501 and receiving terminals 601 and 602 are connected to an LSR network (domain) 901 formed by four LSRs 701 to 704, through communication channels 101 to 103 respectively. The communication channels 101 to 103 are channels for connecting edge LSRs of the LSR network with communication devices external to the LSR network. Each of these channels may not necessarily be a physically single channel and can be a virtual communication channel formed by the router network, for example. Also, VCs 801 to 803 are set up on the communication channels among the LSRs 701 to 704. Each of these channels between the LSRs also may not necessarily be a physically single channel and can be a virtual communication network formed by the ATM network.

The transmitting terminal 501 is transmitting a multicast flow A, a multicast flow B, and a multicast flow C, and the receiving terminals 601 and 602 are receiving these multicast flows. Here, the flows A, B and C are assumed to have the same destination multicast address and source address, but at least one of the destination port number, the source port number and the protocol number is different among them.

In FIG. 8, the ingress LSR 701 of the LSR network 901 is transferring packets belonging to the flows A, B and C to the VC 801, and the next hop LSR 702 is carrying out the cut-through transfer by outputting cells from the input VC 801 to the output VCs 802 and 803.

Now, in the connectionless network such as IP network, for example, the amount of delay exerted on packets becomes larger when the amount of packets that arrive at a router for carrying out the packet transfer becomes larger. However, in this case, each terminal is entrusted to make the judgement as to whether or not to reduce the load on the router by limiting the amount of packets transmitted by the terminal, and each terminal has no obligation to limit the amount of packets it transmits. This is because IP is designed without any consideration for the guarantee of the communication quality. For this reason, in the IP network, it is normally impossible to guarantee the communication quality with respect to a user. However, in order to carry out the video communication, for instance, it is necessary to guarantee the communication quality such as packet transfer delay, and for this reason there are active discussions about the way of guaranteeing the communication quality in the IP network.

For example, in the standardization organization called IETF, a scheme for notifying a necessary bandwidth called RSVP (Resource ReSerVation Protocol) has been proposed. This scheme uses seven types of control messages including Path message. Resv message, PathTear message, ResvTear message, PathErr message, ResvErr message, and Confirmation message. The basic operation of RSVP is that the transmitting terminal notifies the transmission traffic characteristic to the network and the receiving terminal using the control message called Path message, and the receiving terminal notifies a necessary bandwidth to the network using the control message called Resv message. When values in fields of Path message are inappropriate, the network transmits PathErr message, and when values in fields of Resv message are inappropriate, the network transmits ResvErr message. Also, by transmitting PathTear message from a transmitting side node (the transmitting terminal or a router) or ResvTear message from a receiving side node (the receiving terminal or a router), it is possible to delete the reserved bandwidth immediately. In RSVP, the transmission of Path message and Resv message is carried out regularly in order to deal with a change of communication route by the network and a malfunction of a router.

Now, flows of Path message and Resv message in RSVP will be described with reference to FIGS. 9A and 9B.

FIG. 9A shows a flow of Path message in the case where the transmitter terminal (S) 501 transmits Path message. Here, the transmitting terminal (S) 501 is transmitting data packets toward a multicast group to which the receiving terminals (D1) 601 and (D2) 602 belong. Then, the transmitting terminal (S) 501 transmits Path message with the same destination address as the destination address of the data packets. By using the destination address of Path message that is identical to the destination address of the data packet, Path message and the data packet will be transferred through the same route so that a router on the route of the data packet can learn the flow transmitted from the transmitted terminal (S) 501 and its traffic characteristic, as well as an address of a previous hop router, from Path message. Also, the receiving terminal transmits Resv message in order to command the bandwidth reservation to the network.

FIG. 9B shows a flow of Resv messages in the case where the receiving terminals (D1) 801 and (D2) 602 transmit Resv messages. Here, the receiving terminal (D1) 601 is transmitting Resv message toward its previous hop router 702, and as the message is sequentially transferred through the routers on the route, the command for bandwidth reservation is notified to all the routers on the route and the transmitting terminal (S) 501. Also, the receiving terminal (D2) 602 is transmitting Resv message to its previous hop router 702, and this message is sequentially transferred through the route. In FIG. 9B, all the receiving terminals (D1) 601 and (D2) 602 are transmitting Resv messages, but in RSVP, a receiving terminal that does not wish to reserve bandwidth is not required to transmit Resv message. In this way, the necessary bandwidth notification procedure of RSVP is carried out by transmitting the control messages between the transmitting terminal and the receiving terminal that wishes to reserve bandwidth. This transmission of the control messages is also repeated regularly. A full description of the procedure of RSVP outlined here can be found in Internet RFC 2205, Braden et al., "Resource ReSerVation Protocol (RSVP)—Version1 Functional Specification", September, 1997.

Now, when RSVP is to be supported at the LSR, it is preferable to set up a VC for transferring only the specified flows and carry out the cut-through transfer using this VC in order to provide the desired communication quality to the specification flows. FIG. 10 shows an exemplary case where only the receiving terminal (D1) 601 requested bandwidth reservation for the flow A by RSVP, and upon receiving Resv message, VCs 804 and 805 are newly set up for the flow A for which bandwidth is requested, and the flow A are transferred through these VCs 804 and 805. As a result, the VCs 804 and 805 for the flow A alone are set up through the route for which the bandwidth reservation is requested, but in the route between the LSRs 1702 and 1704 for which the bandwidth reservation is not requested, the flows A, B and C are all transferred through through the single VC 803. In this case, there is a problem that the LSR 1702 is required to carry out a special operation to transfer IP packets that arrive from the VCs 801 and 804 into the single VC 803. This operation is called a VC merging. In the case where AAL5 frames are used at the AAL layer of ATM, there is a possibility for the LSR 1702 to receive cells belonging to two AAL5 frames simultaneously, and in such a case, it is necessary to transfer them to the VC 803 such that cells belonging to two AAL5 frames are not mixed up. This operation is required in order to reconstruct AAL5 frames at the receiving side. The VC merging has a drawback in that it increases the amount of processing when it is realized by software, or that it requires a special hardware when it is realized by hardware.

Note that the case of IP network has been described here as a concrete example, but schemes for reserving bandwidth on the connectionless communication network which is not limited to the IP network already exist and are expected to appear in future. Also, the case of carrying out ATM switching has been described here as a concrete example of the LSR, but IP lower layers other than ATM to which the label switching technique is applicable already exist and are expected to appear in future.

As described, in order to reduce the necessary number of VCs in the LSR, it is preferable to transfer as many flows as possible through a single VC and carry out the cut-through transfer using this VC. However, when the bandwidth reservation for a specific flow is requested, if a VC for transferring this flow alone is newly set up, the VC merging would be required.

SUMMARY OF THE INVENTION

It is therefore an object of the present invention to provide a packet transfer method and a node device in which the VC merging is unnecessary at the LSR even when the communication resource reservation (or the high priority transfer) is requested.

According to one aspect of the present invention there is provided a method for transferring packets from a sender to a plurality of receivers via a network of nodes having a network layer processing function, the method comprising the steps of: setting up at each node one or a plurality of virtual channels for a specific flow, toward all of said plurality of receives regardless of whether each receiver requested a communication quality for the specific flow or not, upon receiving a message used in a procedure for reserving the communication quality for the specific flow that is transmitted from an upstream side to a downstream side on a route of the specific flow toward said plurality of receivers; storing at each intermediate node a correspondence between an upstream side virtual channel for the specific flow and one or a plurality of downstream side virtual channels for the specific flow; and transferring packets at each intermediate node by carrying out a transfer processing at a layer lower than a network layer according to the correspondence.

According to another aspect of the present invention there is provided a method for transferring packets from a sender to a plurality of receivers via a network of nodes having a network layer processing function, the method comprising the steps of: setting up at each hole one virtual channel for a specific flow toward at least one receiver among said plurality of receivers, and transmitting notification messages indicating a need to set up virtual channels for the specific flow toward other receivers on a downstream side of each node among said plurality of receivers, upon receiving a message for requesting a communication quality for the specific flow that is transmitted from said at least one receiver to the sender toward an upstream side, such that a separate virtual channel set up procedure for setting up virtual channels for the specific flow toward the other receivers is activated among nodes on a route of the specific flow in response to the notification messages; storing at each intermediate node a correspondence between an upstream side virtual channel for the specific flow and one or a plurality of downstream side virtual channels for the specific flow; and transferring packets at each intermediate node by carrying out a transfer processing at a layer lower than a network layer according to the correspondence.

According to another aspect of the present invention there is provided a method for transferring packets from a sender to a plurality of receivers via a network of nodes having a network layer processing function, the method comprising the steps of: setting up at each node virtual channels toward said plurality of receivers that can be shared by a plurality of flows; outputting packets to the virtual channels at a node for transferring packets by a transfer processing at a network layer, such that when a communication quality for one flow among said plurality of flows is requested by one receiver among said plurality of receivers, packets belonging to said one flow are outputted to the virtual channels at higher priority than packets belonging to other flows among said plurality of flows: storing at each intermediate node a correspondence between an upstream side virtual channel that can be shared by said plurality of flows and one or a plurality of downstream side virtual channels that can be shared by said plurality of flows; and transferring packets at each intermediate node by carrying out a transfer processing at a layer lower than a network layer according to the correspondence.

According to another aspect of the present invention there is provided a node device on a route for transferring packets from a sender to a plurality of receivers, comprising: a processing unit for applying a network layer processing to packets; a virtual channel set up unit for setting up one or a plurality of virtual channels for a specific flow, toward all of said plurality of receivers regardless of whether each receiver requested a communication quality for the specific flow or not, upon receiving a message used in a procedure for reserving the communication quality for the specific flow that is transmitted from an upstream side to a downstream side on a route of the specific flow toward said plurality of receivers; a memory for storing a correspondence between an upstream side virtual channel for the specific flow and one or a plurality of downstream side virtual channels for the specific flow; and a transfer unit for transferring packets by carrying out a transfer processing at a layer lower than a network layer according to the correspondence.

According to another aspect of the present invention there is provided a node device on a route for transferring packets from a sender to a plurality of receivers, comprising: a processing unit for applying a network layer processing to packets; a virtual channel set up unit for setting up one virtual channel for a specific flow toward at least one receiver among said plurality of receivers, and transmitting notification messages indicating a need to set up virtual channels for the specific flow toward other receivers on a downstream side of the node device among said plurality of receivers, upon receiving a message for requesting a communication quality for the specific flow that is transmitted from said at least one receiver to the sender toward an upstream side, such that a separate virtual channel set up procedure for setting up virtual channels for the specific flow toward the other receivers is activated among nodes on a route of the specific flow in response to the notification messages; a memory for storing a correspondence between an upstream side virtual channel for the specific flow and one or a plurality of downstream side virtual channels for the specific flow; and a transfer unit for transferring packets by carrying out a transfer processing at a layer lower than a network layer according to the correspondence.

According to another aspect of the present invention there is provided a network of nodes for transferring packets from a sender to a plurality of receivers, each node having a processing unit for applying a network layer processing to packets and a virtual channel set up unit for setting up virtual channels toward said plurality of receivers that can be shared by a plurality of flows, and the network including: an edge node for transferring packets by a transfer processing at a network layer, such that when a communication quality for one flow among said plurality of flows is requested by one receiver among said plurality of receivers, packets belonging to said one flow are outputted to the virtual channels at higher priority than packets belonging to other flows among said plurality of flows; and at least one intermediate node having a memory for storing a correspondence between an upstream side virtual channel that can be shared by said plurality of flows and one or a plurality of downstream side virtual channels that can be shared by said plurality of flows, and a transfer unit for transferring packets by carrying out a transfer processing at a layer lower than a network layer according to the correspondence.

Other features and advantages of the present invention will become apparent from the following description taken in conjunction with the accompanying drawings.

BRIEF DESCRIPTION OF THE DRAWINGS

FIG. 2 is a diagram showing an exemplary configuration of an output VC search table used in the LSR of FIG. 1.

DETAILED DESCRIPTION OF THE PREFERRED EMBODIMENTS

Now, the preferred embodiments of the packet transfer method and the node device according to the present invention will be described in detail with references to the drawings.

Note that the following description will be directed to the case of using ATM as media for conveying IP packets, but the present invention is applicable to any media in which the Label Switching technique as proposed by the MPLS working group of IETF can be used. Also, the following description is directed to the case of using IP network, but the present invention is applicable to any packet network in which the Label Switching technique can be used.

First, the basic configuration of the LSR and a concrete example to which the present invention is to be applied will be described.

Figure 1:
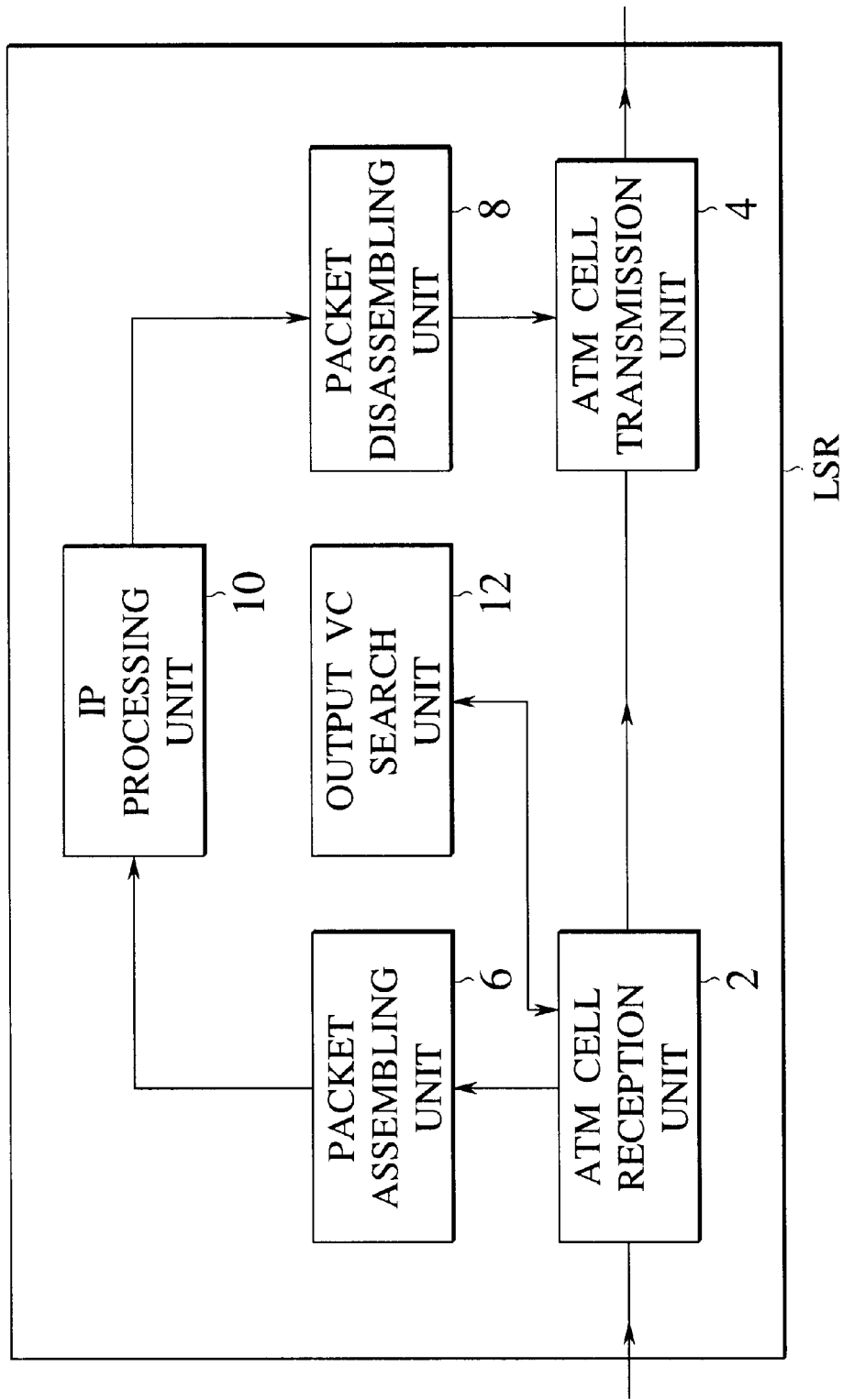
FIG. 1 is a block diagram showing an exemplary basic configuration of an LSR (Label Switch Router) according to the present invention.

FIG. 1 shows an exemplary basic configuration of the LSR according to the present invention, which has at least one input interface (not shown) and at least one output interface (not shown), and comprises an ATM cell reception unit 2, an ATM cell transmission unit 4, a packet assembling unit 6, a packet disassembling unit 8, an IP processing unit 10, and an output VC search unit 12. Note that the IP processing unit 10 may be omitted in the case of an intermediate node.

The ATM cell reception unit 2 receives ATM cells, and notifies their input link and VPI and VCI values written in their cell headers to the output VC search unit 12 so as to request the search of the output link. VPI and VCI that are set in correspondence to the input link, VPI and VCI. The output VC search unit 12 has an output VC search table from which the corresponding output link, VPI and VCI are searched out by using the entered input link, VPI and VCI as a search key, and returns the search result to the ATM cell reception unit 2. When the corresponding output VC exists, the received ATM cells are given to the ATM cell transmission unit 4, and the ATM cell transmission unit 4 then transmits them by using the corresponding output link, VPI and VCI and the reserved bandwidth according to the entry in the output VC search table. In this way, the cut-through transfer for transferring packets without the IP processing is realized.

When the corresponding entry does not exist in the output VC search table, the ATM cell reception unit 2 gives the received ATM cells to the packet assembling unit 6. The packet assembling unit 6 then assembles IP packets from the received ATM cells, and gives the assembled IP packets to the IP processing unit 10. The IP processing unit 10 then determines the output link and the next hop node for the received IP packets by searching through a routing table, and gives the IP packets to the packet cell disassembling unit 8.

The packet disassembling unit 8 then disassembles the IP packets into ATM cells and gives the ATM cells to the ATM cell transmission unit 4. The ATM cell transmission unit 4 then transmits the ATM cells through the output link as determined by the IP processing unit 10, by attaching VPI and VCI of a VC connected to the next hop node as determined by the IP processing unit 10. A VC to which the ATM cells are transmitted at this point is set up in advance between the neighboring LSRs, which is a VC to be used in transferring packets that cannot be cut-through transferred.

FIG. 2 shows an exemplary configuration of the output VC search table, in which each entry has fields for the input VC (link VPI, VCI), the output VC (link, VPI, VCI) and the reserved bandwidth. In FIG. 2, the reserved bandwidth equal to 0 implies that the bandwidth reservation is not carried out, that is, the communication quality is not guaranteed. Also, FIG. 2 indicates the reserved bandwidth explicitly, but instead of that, it is also possible to write the priority level at a time of cell transfer such that those cells for which the bandwidth is not reserved are transferred at low priority while those cells for which the bandwidth is reserved are transferred at high priority.

In the case of FIG. 2, when the ATM cell reception unit 2 receives cells from the input VC (link, VPI, VCI)=(0, 10, 32), the received cells are given to the ATM cell transmission unit 4 without giving them to the packet assembling unit 6. The ATM cell transmission unit 4 then transmits these cells from the output link No. 1 with (VPI, VCI)=(11, 33). In the transfer of these ATM cells, the communication quality is not guaranteed. Also, when the ATM cell reception unit 2 receives cells from the input VC (link, VPI, VCI)=(1, 12, 34), the received cells are given to the ATM cell transmission unit 4 without giving them to the packet assembling unit 6. The ATM cell transmission unit 4 then transmits these cells from the output link No. 2 with (VPI, VCI)=(13, 35). In the transfer of these ATM cells, the transfer is carried out by the bandwidth of 1.5 [Mbps]. In addition, copies of these ATM cells are also transmitted from the output link No. 3 with (VPI, VCI)=(14, 36). In the transfer of these ATM cells, the communication quality is not guaranteed.

On the other hand, when the ATM cell reception unit 2 receives cells from the input VC (link, VPI, VCI) which is neither (0, 10, 32) nor (1, 12, 34), there is no corresponding entry in the output VC search table, so that the received cells are given to the packet assembling unit 6, Thereafter, these cells are processed at the IP processing unit 10, the packet disassembling unit 8 and the ATM cell transmission unit 4.

Figure 8:
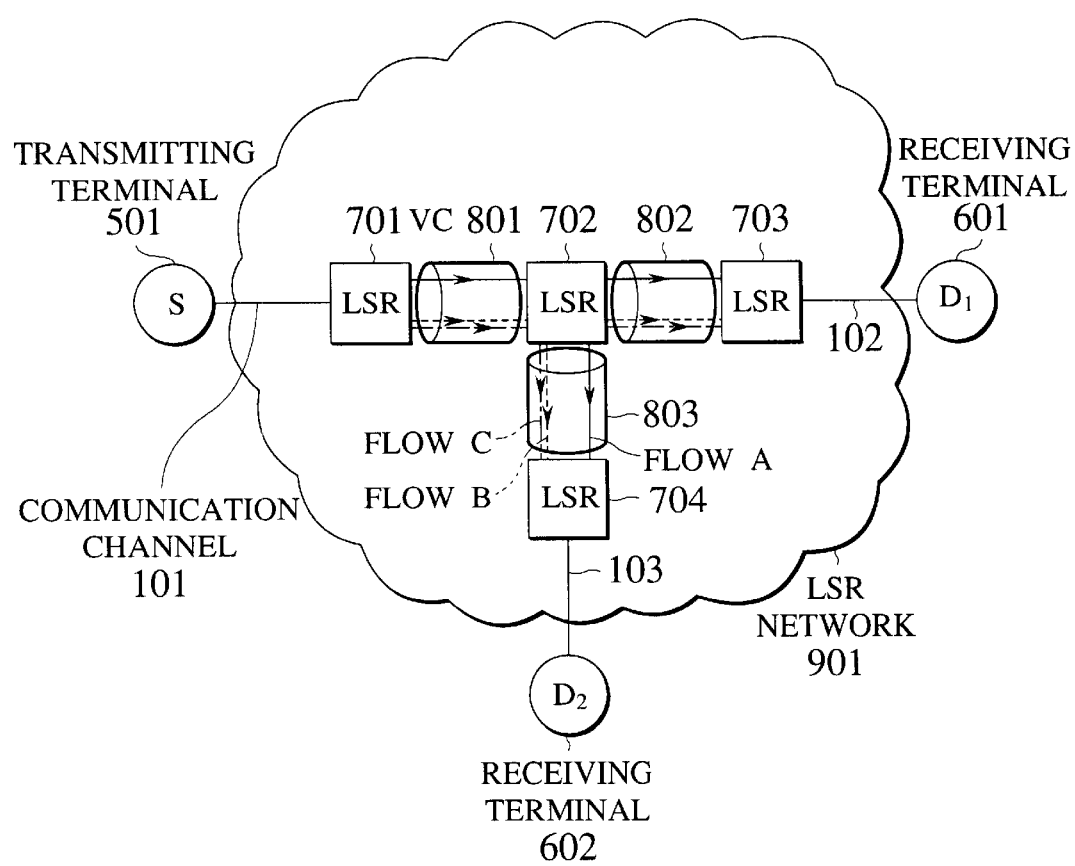
FIG. 8 is a diagram showing an exemplary initial VC set up to which the present invention is to be applied.
Figure 9A:
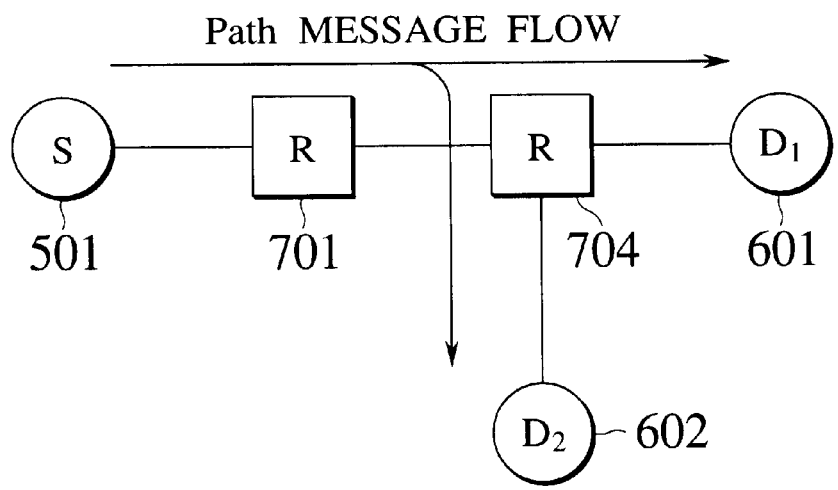
FIGS. 9A and 9B are diagrams showing RSVP (Resource ReSerVation Protocol) Path message flow and Resv message flow, respectively.
Figure 9B:
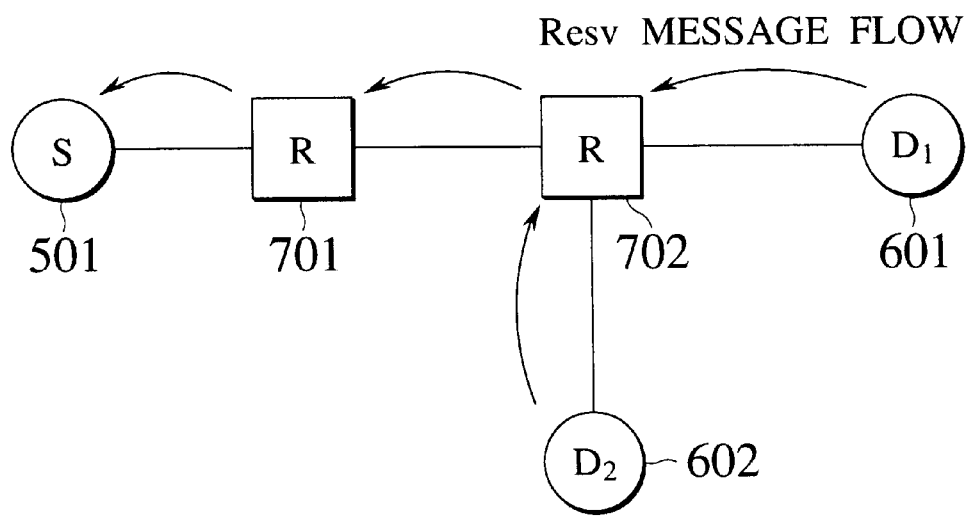
Figure 10:
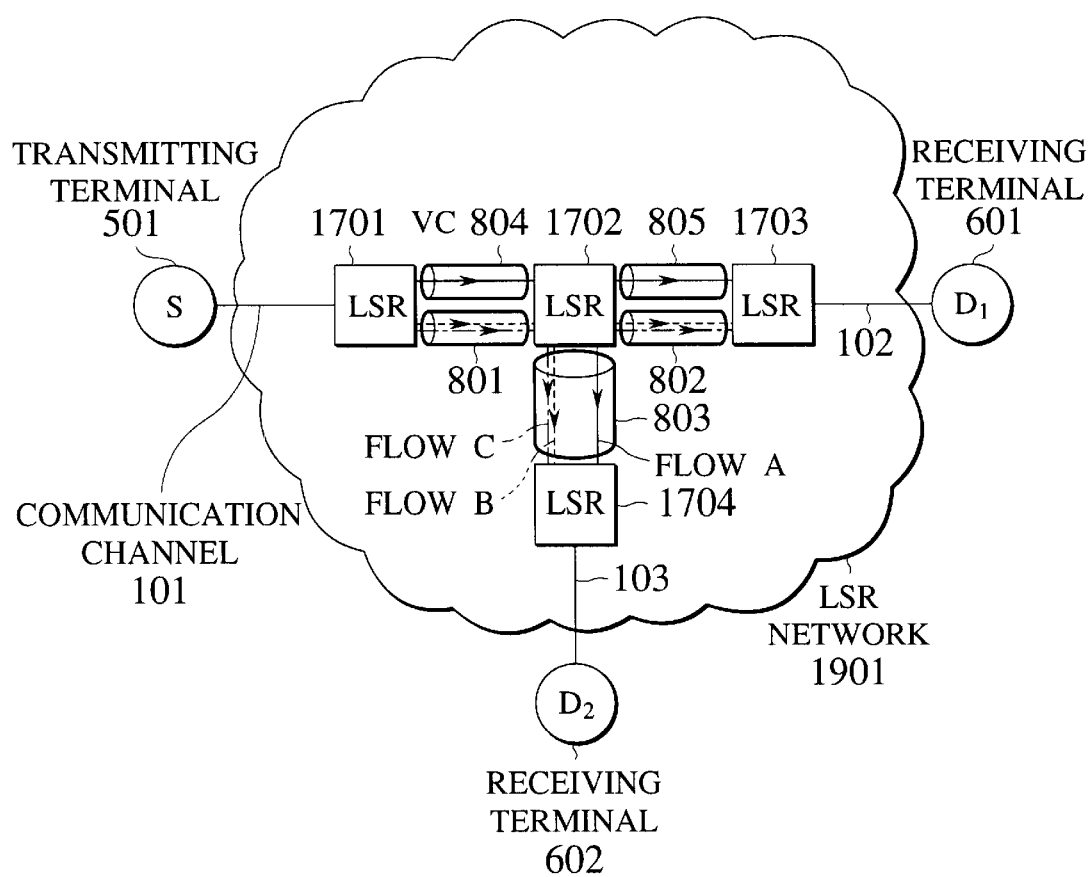
FIG. 10 is an exemplary VC set up obtained by the conventional LSRs using VC merging from an initial state of FIG. 8.

In FIG. 8, the LSR 701 stores a correspondence between each flow and a VC from which the packets of that flow should be outputted, and disassembles the IP packets of the received flows A, B and C and outputs them to the VC 801 according to the stored correspondence. The LSR 702 can carry out the cut-through transfer without the IP processing for the flows A, B and C by registering the VC 801 into an entry of the output VC search table, and registering the VCs 802 and 803 into the output VC field of that entry. Note that the flows A, B and C that share the same route are transferred through the same VC at least within the LSR network 901 in order to reduce the necessary number of VCs.

In the following, the specific embodiments of the present invention in which the VC merging is unnecessary at the LSR even when the communication resource reservation (or the high priority transfer) for the flow to be cut-through transferred is requested will be described.

First Embodiment

In the first embodiment, a VC for transferring the flow specified by Path message is set up whenever Path message is received, even if the bandwidth reservation request is not made, that is Resv message is not received, and the cut-through transfer is carried out by using this VC. Then, the reservation of the bandwidth for the cell transfer within the LSR is made when Resv message is actually received. At this point, it is preferable to reserve the bandwidth by changing a VC connected to the downstream LSR that transmitted Resv message, to a VC with the higher communication quality, as in the case of changing from UBR (Unspecified Bit Rate) to CBR (Constant Bit Rate), for example.

Figure 3:
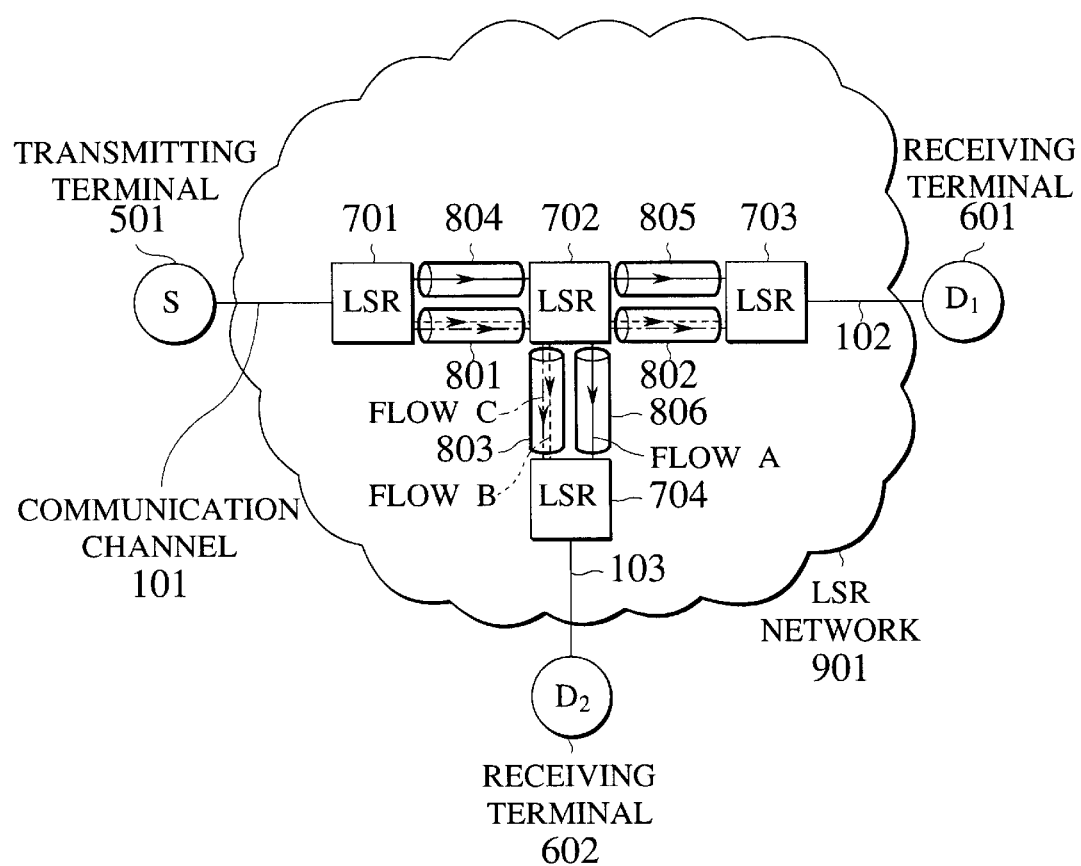
FIG. 3 is a diagram showing an exemplary VC set up obtained by the LSRs of the first or second embodiment of the present invention from an initial state of FIG. 8.

In this way, the VC set up state and the flow transfer state can be changed from that shown in FIG. 8 to that shown in FIG. 3, for example.

In FIG. 3, the transmitting terminal 501 is transmitting Path message of RSVP for the sake of the flow A. By receiving this Path message, each of th LSRs 701 and 702 can learn (destination address, destination port number, protocol number) from a SESSION object contained in Path message and (source address, source port number) from a SENDER_TEMPLATE object contained in Path message, so that it becomes possible to identify the flow to which this Path message is directed, that is the flow A. The LSRs 701 to 704 set up VCs 804 to 806 for the purpose of transferring the flow A upon receiving Path message. The LSR 702 creates an entry with 804 as the input VC and 805 and 806 as the output VCs in the own output VC search table. Here, however, the reserved bandwidth for the cell transfer is set to 0. Also, it is preferable to set up VCs 804 to 806 as UBR.

The LSR 701 updates a correspondence between each flow and a VC from which the packets of that flow should be outputted. Then, when the packets belonging to the flow A are received, these packets are disassembled into cells and transmitted using VC 804, whereas when the packets belonging to the flow B or C are received, these packets are disassembled into cells and transmitted using VC 801. The LSR 702 then carries out the cut-through transfer to VC 805 and VC 806 for the cells received from VC 804, as well as the cut-through transfer to VC 802 and VC 803 for the cells received from VC 801 as before.

Next, when Resv message for requesting the bandwidth reservation for the flow A arrives from the receiving terminal 601, upon receiving this Resv message, the LSR 702 writes the bandwidth corresponding to the request bandwidth Flowspec that is written in that Resv message into the corresponding entry of the output VC search table, that is into the reserved bandwidth field of an entry with 804 as the input VC and 805 as the output VC. Then, Resv message is transmitted to the LSR 701. At this point, it is preferable to change VC 805 to a VC with the better communication quality such as CBR-VC, for example.

Here, if there is not enough communication resources to allocate the bandwidth at the LSR 702. ResvErr message is transmitted to the LSR 703, and the output VC search table is left unchanged.

Upon receiving Resv message, the LSR 701 allocates the bandwidth corresponding to the requested bandwidth Flowspec that is written in that Resv message to the flow A. Namely, the packets belonging to the flow A are transferred to VC 804 at that rate. At this point, it is preferable to change VC 804 to a VC with the better communication quality such as CBR-VC, for example. Then, the LSR 702 will transfer copies of the cells arrived from VC 804 of CBR to VC 805 of CBR and VC 806 of UBR.

By the above operation, it is possible to guarantee the bandwidth only with respect to a route from the transmitting terminal to the receiving terminal that requested the bandwidth reservation, for the flow A for which the bandwidth reservation is requested by RSVP, without requiring the VC merging.

Note that it is also possible to provide some level of communication quality to a route of the receiving terminal which is transmitted Resv message by setting up VC 804 and VC 805 by UBR and carrying out the priority control between UBRs (the transfer processing for transferring cells of VCs 804 and 805 at higher priority than cells of VCs 801 and 802) at the LSRs 701 and 702.

In addition, in FIG. 3, when the receiving terminal 602 also transmitted Resv message for requesting the bandwidth, upon receiving this Resv message, the LSR 702 writes the bandwidth corresponding to the request bandwidth Flowspec that is written in that Resv message into the corresponding entry of the output VC search table, that is into the reserved bandwidth field of an entry with 804 as the input VC and 806 as the output VC. Then, Resv message is transmitted to the LSR 701. At this point, it is preferable to change VC 806 to a VC with the better communication quality such as CBR-VC, for example.

Here, if there is not enough communication resources to allocate the bandwidth at the LSR 702, ResvErr message is transmitted to the LSR 704, and the output VC search table is left unchanged.

By the above operation, it is possible to guarantee the bandwidth only with respect to routes from the transmitting terminal to the receiving terminals that requested the bandwidth reservation, for the flow A for which the bandwidth reservation is requested by RSVP, without requiring the VC merging.

Note that, at a time of setting up a VC for transferring the target flow upon receiving Path message, Path message itself can be used as the protocol for VC set up, or another VC set up protocol other than Path message may be activated.

Next, the case where a VC cannot be set up upon receiving Path message will be described.

In this first embodiment, a VC for transferring the target flow is set up and the cut-through transfer using this VC is carried out upon receiving Path message. However, when this VC set up fails, the LSR that failed to set up a VC should preferably transmit PathErr message with a value indicating the failure of VC set up written therein as Err Code, to the upstream LSR. This PathErr message will be transferred up to the ingress LSR of the LSR network. When this PathErr message is received, the ingress LSR should preferably stop transferring the flow A through the VC set up for its sake, over a prescribed period of time such as while Path messages are transmitted N times for example. Also, when the ingress LSR transfers PathErr message to the upstream node, it is preferable to transfer PathErr message to the upstream node after changing Err Code is not a value specified in the RSVP specification, such as 23 (Err Code=23 indicates RSVP system error).

For example, when the LSR 702 failed to set up a VC 806 connected to the LSR 704, an Err Code value indicating this fact is newly defined, and PathErr message with this Err Code written therein is transmitted to the LSR 701. Then, after a prescribed period of time, the flow A is transferred to VC 801 rather than VC 804, and also PathErr message with the Err Code=23 written therein is transmitted to the transmitting terminal 501.

Next, the case where the LSRs are connected through a multi-access network will be described. The description of the first embodiment up to this point has been directed to the case where the LSRs are connected through point-to-point links. However, when the LSRs are connected through a multi-access link, it is still possible to apply the first embodiment as follows.

Figure 4:
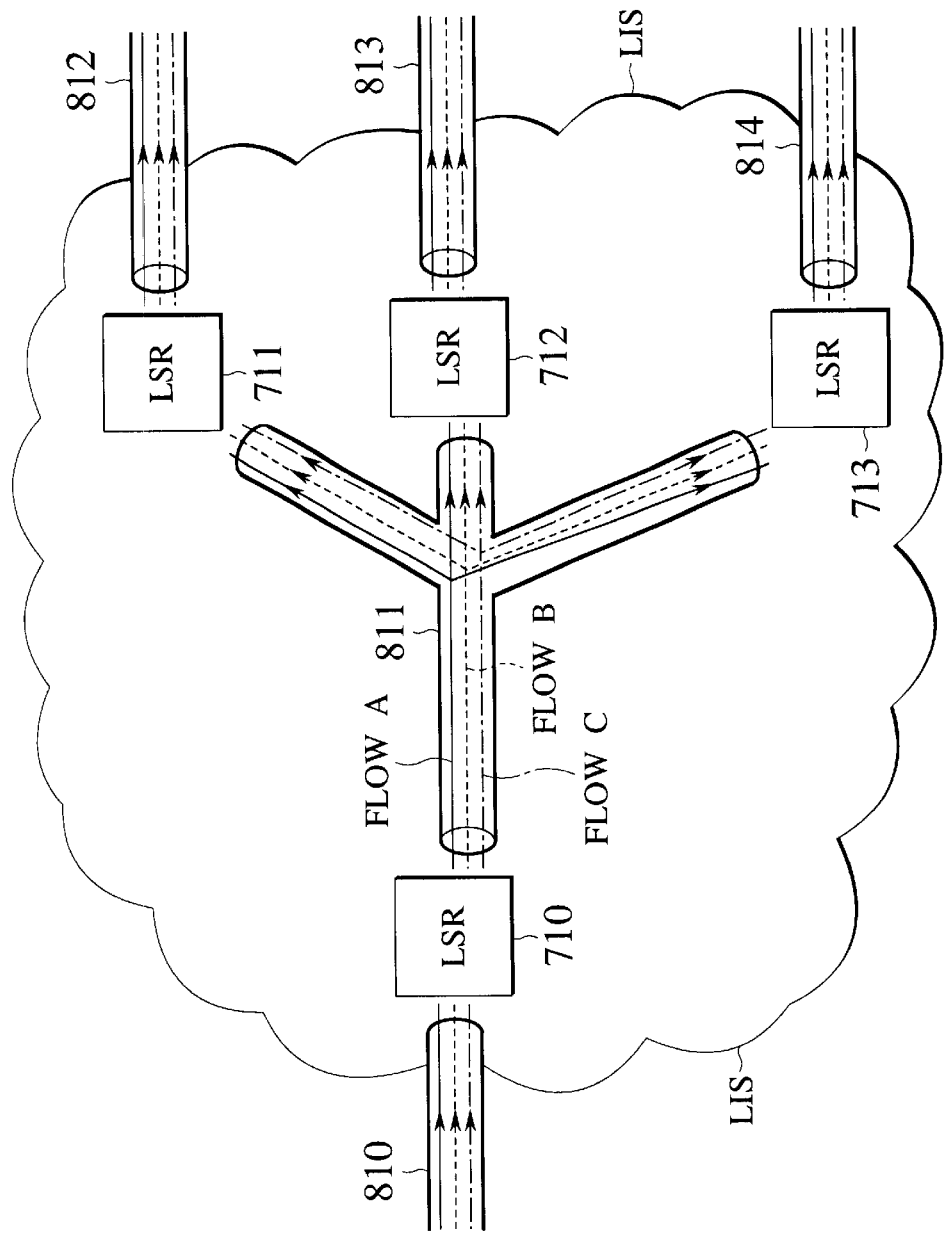
FIG. 4 is a diagram showing an exemplary initial VC set up in the case of utilizing multi-access link, to which the present invention is to be applied.

FIG. 4 shows a situation where LSRs 710 to 713 are connected to a single logical subnet (LIS: Logical IP Subnetwork) formed by an ATM network. This single subnet corresponds to a section between the neighboring LSRs (such as 702 and 703) in FIG. 8. Before Path message is received, the flows A, B and C are all transferred through a single VC 811 as shown in FIG. 4. Note that FIG. 4 is depicted as if the VC 811 is connected to all the nodes in the LIS, but it is preferable not to connect the VC 811 to those nodes for which there is no need to transfer the flows A, B and C.

Figure 5:
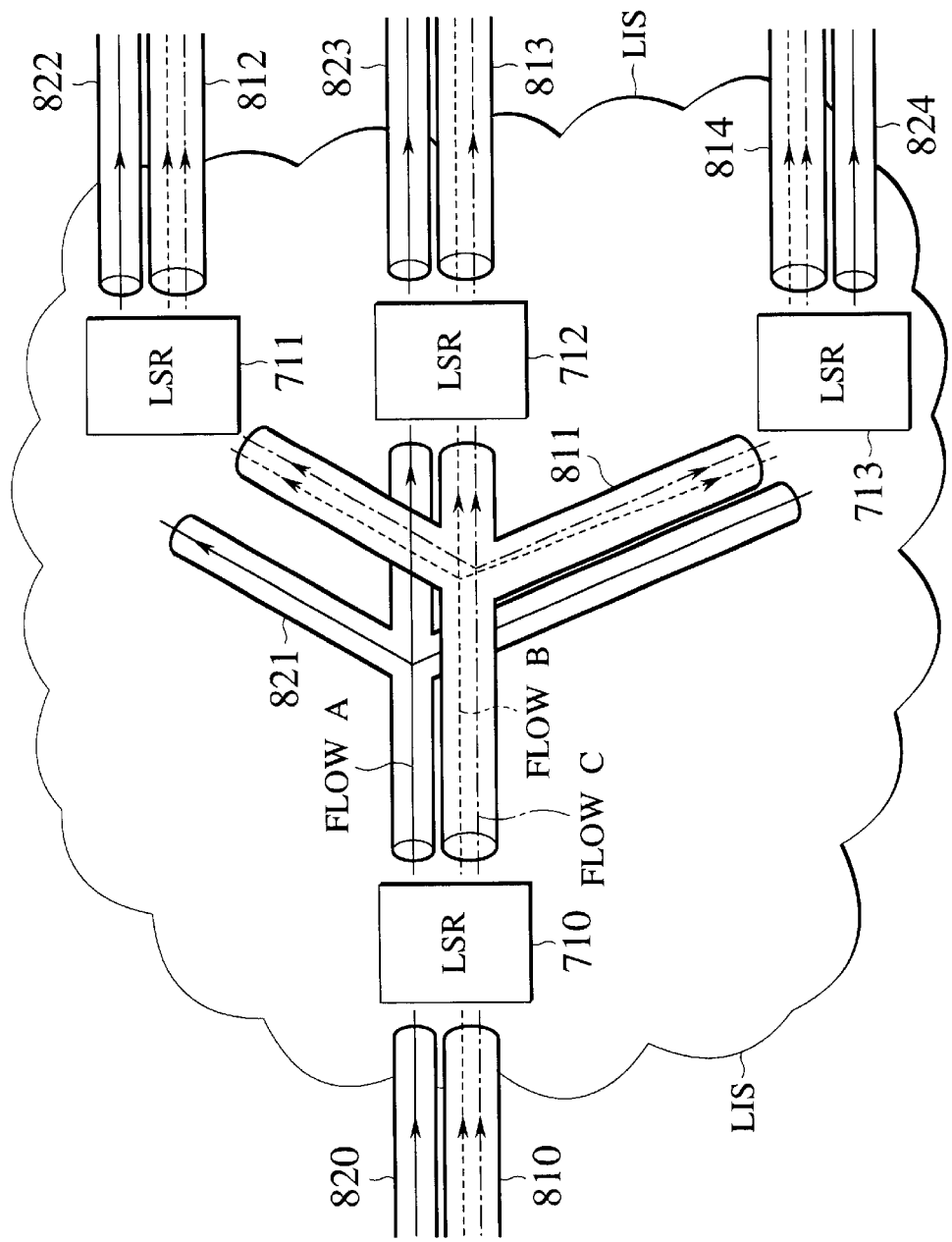
FIG. 5 is a diagram showing an exemplary VC set up obtained by the LSRs of the present invention from an initial state of FIG. 4 in the case of utilizing multi-access link.

The operation of the LSR 70 upon receiving Path message for the flow A will now be described with reference to FIG. 5. When Path message for the flow A is received, the LSR 710 sets up a new VC 821 connected to next hop LSRs 711 to 713 to which the flow A should be transferred. At this point, the VC 821 should preferably be UBR-VC. When a VC 820 for transferring the flow A is set up from the upstream LSR, the LSR 710 registers an entry with 820 as the input VC and 821 as the output VC in the output VC search table so that it becomes possible to carry out the cut-through transfer. At this point, the reserved bandwidth field of that entry in the output VC search table is set equal to 0.

When the LSR 710 receives Resv message from the next hope LSR such as the LSR 711, the LSR 710 writes the bandwidth corresponding to the request bandwidth Flowspec that is written in that Resv message into the corresponding entry of the output Vc search table, that is into the reserved bandwidth field of an entry with 820 as the input VC and 821 as the output VC. In this way, the bandwidth is reserved at a time of transfer of the flow A at the LSR 710. Then, Resv message is transmitted to the upstream node. At this point, it is preferable to change VC 821 to a VC with the better communication quality such as CBR-VC, for example.

Thus even when the LSRs are connected through a multi-access link, it is still possible to apply the first embodiment by using the multicast VC and carrying out the same processing as in the case of using point-to-point links.

Next, the case where there is no best effort cut-through VC will be described. The description of the first embodiment up to this point has been directed to the case where there exists a VC for transferring the flows A, B and C among the LSRs and the cut-through transfer using this VC is carried out for these flows. However, even when this VC does not exist, it is still possible to apply the first embodiment by newly setting up a VC for the flow A at the LSR which received Path message for the flow A.

Next, the case where the bandwidth reservation fails in a middle of the route will be described. When the set up of a VC with the reserved bandwidth upon receiving Resv message fails. ResvErr message with Err Code newly defined to indicate this fact written therein can be transmitted, and the LSR which received this ResvErr message can release the reserved bandwidth of the VC for transferring the corresponding flow, over a prescribed period of time such as while Resv messages are transmitted N times. In this way, it becomes possible to avoid reserving the bandwidth only at a part of the route when the bandwidth reservation fails in a middle of the route. In this case, the egress edge LSR that received this ResvErr message should preferably transmit ResvErr message after changing Err Code into a value specified in the RSVP specification. It is also possible to leave the reserved bandwidth of the VC for transferring the corresponding flow unchanged even when ResvErr message is received, and carry out the cut-through transfer using a VC (without reserved bandwidth) for that flow on the upstream side and a VC (with reserved bandwidth) on the downstream side.

Figure 6:
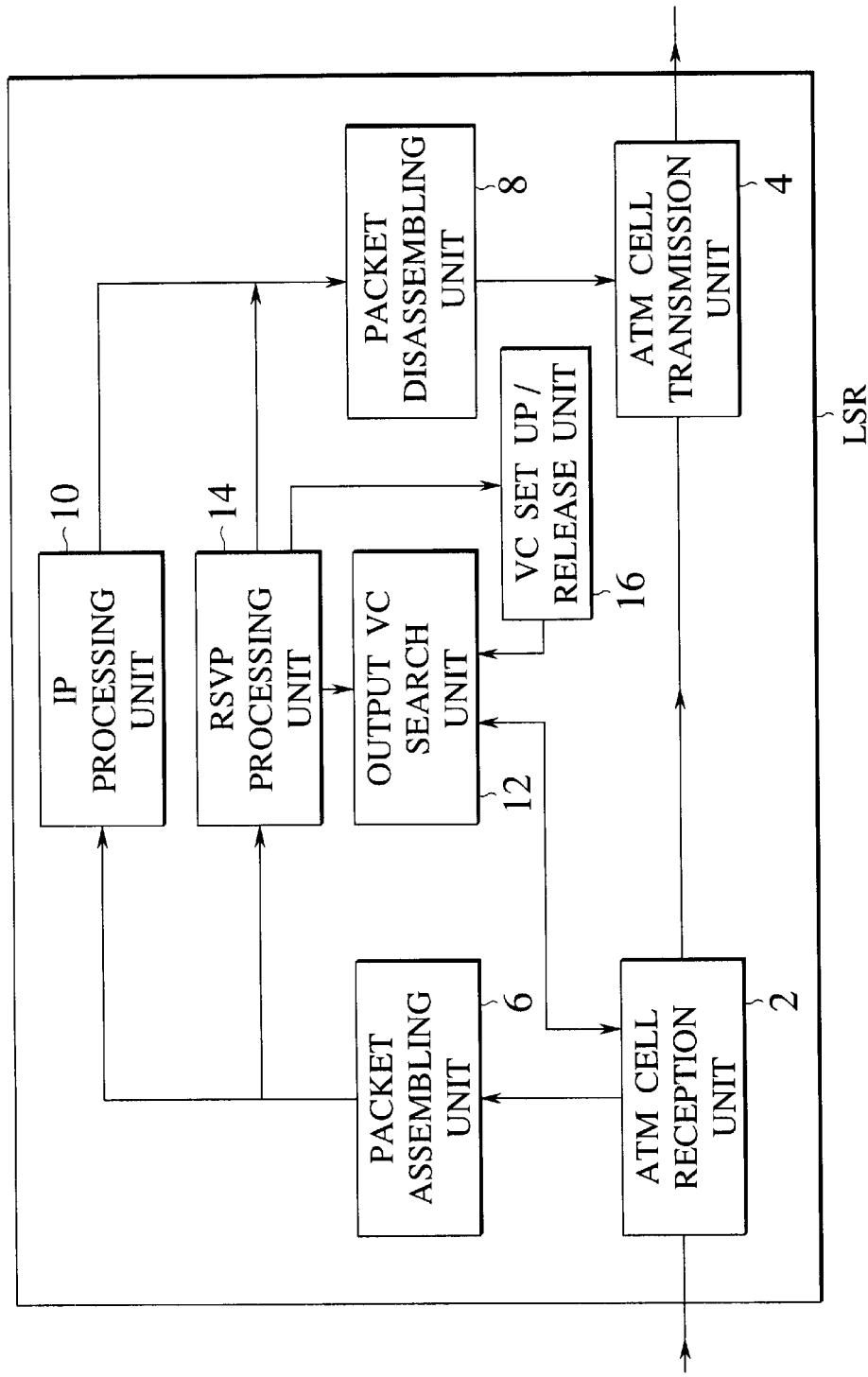
FIG. 6 is a block diagram showing an exemplary configuration of an LSR suitable for the preferred embodiments of the present invention.

Next, FIG. 6 shows an exemplary configuration of the LSR for realizing this first embodiment. In addition to the configuration of FIG. 1, this LSR of FIG. 6 has an RSVP processing unit 14 and a VC set up/release unit 16. Here, only the RSVP processing unit 14 and the VC set up/release unit 16 will be described.

When the received packet is an RSVP packet, there is no corresponding entry in the output VC search table, so that cells received at the ATM cell reception unit 2 are assembled into IP packets at the packet assembling unit 6 and given to the RSVP processing unit 14.

The RSVP processing unit 14 processes the RSVP message, commands the VC set up/release unit 16 according to the message content as described above, reserves/releases the bandwidth of the communication resources such as switch within the own device (or commands the priority control to the ATM cell reception unit 2 and/or the ATM cell transmission unit 4), and updates the reserved bandwidth field of the corresponding entry in the output VC search table. Also, the content of Path message or Resv message is stored if necessary.

The VC set up/release unit 18 carries out the reservation/release of the bandwidth of the VC according to a command from the RSVP processing unit 14. Note that the change the communication quality for the VC, from UBR to CBR for example, can be realized by releasing a VC of UBR once and setting up a VC of CBR for that flow again.

Here, the case of using RSVP as a way of notifying the bandwidth reservation has been described, but the first embodiment is equally applicable to the case of using any other way of notifying the bandwidth reservation without using RSVP as long as it notifies a flow that has a possibility of requesting the bandwidth reservation (communication resource reservation or higher priority transfer) to the LSRs on the route of the flow, and essentially the same effects as described above can be realized even in such a case.

Second Embodiment

In the second embodiment, instead of setting out a VC for the flow specified by RSVP immediately upon receiving Path message as in the first embodiment, the LSR transmits Path message with a value commanding set up of a VC for the flow specified by RSVP written therein, at least toward those receiving terminals that have not transmitted Resv message (or toward all the receiving terminals) when at least one of the receiving terminals transmitted Resv message, so as to set up a VC dedicated for that flow on the route of that flow, and then the cut-through transfer using this VC is carried out. In addition, it is preferable to change the VC on a route between the receiving terminal that has transmitted Resv message and the transmitting terminal within the route of that flow to a VC with a better communication quality.

Figure 7:
FIG. 7 is a diagram showing an exemplary configuration of an VC_SETUP object used in the second embodiment of the present invention.

To this end, in the second embodiment, a new object called VC_SETUP object which can be contained in Path message is defined. The VC_SETUP object is an object of 4 bytes size, which has a PATH_SETUP field. This field takes either one of the two values SETUP and TEARDOWN. The LSR which received Path message with the PATH_SETUP field having a value SETUP will attempt the VC set up upon receiving this Path message. The LSR which received Path message with the PATH_SETUP field having a value of TEARDOWN will disconnect the VC for the corresponding flow if exists. An exemplary configuration of this VC_SETUP object is shown in FIG. 7.

Now, in this second embodiment, when the ingress LSR of the LSR network transmits Path message in an initial state as shown in FIG. 8, for example, Path message containing the VC_SETUP object is transmitted, with a value TEARDOWN for the PATH_SETUP field at the beginning. The LSR which received this Path message then transmits Path message containing the VC_SETUP object with the same value as usual, because there is no VC for the corresponding flow.

The LSR which received Resv message transmits Path message with the PATH_SETUP field having a value SETUP written therein from all the output interfaces at which the corresponding flow should be outputted (or the output interfaces other than that from which Resv message is received). Then, a VC dedicated to that flow for which the bandwidth is reserved (or through which cells are to be transmitted at higher priority than the other VCs) is set up on the route with respect to which the bandwidth reservation is requested by Resv message, while a VC dedicated to that flow for which the bandwidth is not reserved to set up on the other routes, and Resv message is transmitted to the upstream side. In this way, VCs can be set up as shown in FIG. 3, starting from the initial state of FIG. 8, for example.

Note that the LSR which failed to set up a VC for which the bandwidth is reserved will transmit ResvErr message to the downstream side. On the other hand, the LSR which failed to set up a VC for which the bandwidth is not reserved will transmit PathErr message with Err Code indicating this fact written therein. The LSR which received this PathErr message transfers this message to the upstream LSR. The LSR at which the bandwidth reservation state is deleted as Resv message was not received over a prescribed period of time will set a value of the VC_SETUP object in Path message to be transmitted equal to the value received from the upstream side.

The ingress LSR of the LSR network which did not receive Resv message transmits Path message with the VC_SETUP object having a value TEARDOWN.

Here, the rules to be followed by the ingress LSR of the LSR network are as follows.

(1) When Resv message was received within the past prescribed period of time, set the value of the PATH_SETUP field to SETUP.

(2) When the above (1) is not the case, set the initial value of the PATH_SETUP filed to TEARDOWN.

(3) Regularly transmit Path message containing the VC_SETUP object with the PATH_SETUP field value as determined by the above (1) or (2).

Also, the rules to be followed by the LSR inside the LSR network are as follows.

(1) When Resv message was received within the past prescribed period of time, set the value of the PATH_SETUP field to SETUP.

(2) When the above (1) is not the case, set the value of the PATH_SETUP field equal to the value of the PATH_SETUP field in Path message received from the upstream side.

(3) Regularly transmit Path message containing the VC_SETUP object with the PATH_SETUP field value as determined by the above (1) or (2).

Next, the operation in this second embodiment will be described.

First, in FIG. 8, the transmitting terminal 501 is transmitting Path message for the flow A using a VC (not shown) in which the cut-through transfer is not carried out. At this point, the value of the VC_SETUP object in Path message transmitted by the ingress LSR 701 is TEARDOWN.

Then, when the receiving terminal 601 transmits Resv message requesting the bandwidth reservation for the flow A, upon receiving this Resv message, the LSR 703 reserves the bandwidth for the flow A on the communication channel 102, and transmits Resv message to the LSR 702. When Resv message is received, the LSR 702 sets up a VC 805 for the flow A as shown in FIG. 3 and transmits Resv message to the LSR 701. At the same time, the LSR 702 also transmits Path message with a value SETUP written in the VC_SETUP object to the LSR 704 and sets up a VC 806. When Resv message is received, the LSR 701 sets up a VC 804 for the flow A as shown in FIG. 3, and transfers packets belonging to the flow A at a rate according to the reserved bandwidth using this VC 804. At this point, the LSR 702 registers an entry with 804 as the input VC and 805 and 806 as the output VC in the output VC search table, and registers a value corresponding to the reserved bandwidth Flowspec in the reserved bandwidth field for the VC 805 and a value 0 in the reserved bandwidth field for the VC 806. In this way, it is possible to reserve the bandwidth for the flow A without requiring the IP processing. There is also no need to carry out the VC merging.

Here, when the LSR 702 fails to set up the VC 806, the LSR 702 transmits PathErr message with Err Code indicating this fact written therein. At this point, the LSR 702 should preferably not transfer Resv message to the LSR 711. Also, the LSR 701 which received this PathErr message should preferably transfer the flow A to the VC 801 rather than the VC 804. In this way, the LSR 702 can carry out the cut-through transfer for the flow A using VCs 801 to 803.

Also, the LSR 702 transmits Resv message to the LSR 701, and upon receiving this Resv message, the LSR 701 reserves the bandwidth in the VC 804, and here it is preferable to start transferring the flow A to the VC 804 (updating the correspondence between each flow and VC to which packets of that flow should be outputted) at this point.

Next, the case where a VC cannot be set up upon receiving Path message will be described.

In this second embodiment, a VC for transferring the target flow is set up and the cut-through transfer using this VC is carried out upon receiving Path message with the PATH_SETUP field having a value SETUP. However, when this VC set up fails, the LSR that failed to set up a VC should preferably transmit PathErr message with a value indicating the failure of VC set up written therein as Err Code, to the upstream LSR. This PathErr message will be transferred up to the ingress LSR of the LSR network. When this PathErr message is received, the ingress LSR should preferably stop transferring the flow A through the VC set up for its sake, over a prescribed period of time such as while Path messages are transmitted N times for example. Also, when the ingress LSR transfers PathErr message to the upstream node, it is preferable to transfer PathErr message to the upstream node after changing Err Code into a value specified in the RSVP specification, such as 23 (Err Code=23 indicates RSVP system error).

For example, when the LSR 702 failed to set up a VC 806 connected to the LSR 704, an Err Code value indicating this fact is newly defined, and PathErr message with this Err Code written therein is transmitted to the LSR 701. Then, after a prescribed period of time, the flow A is transferred to VC 801 rather than VC 804, and also PathErr message with the Err Code=23 written therein is transmitted to the transmitting terminal 501.

By using the PATH_SETUP field of Path message in this way, it becomes possible to command the VC set up even to those LSRs on the route to which Resv message is not transferred. Also, by using the reception of Path message (or Resv message) as a timing for the VC set up, it becomes possible to separate the actual VC set up protocol from RSVP, so that various VC set up protocols become utilizable.

Figure 11:
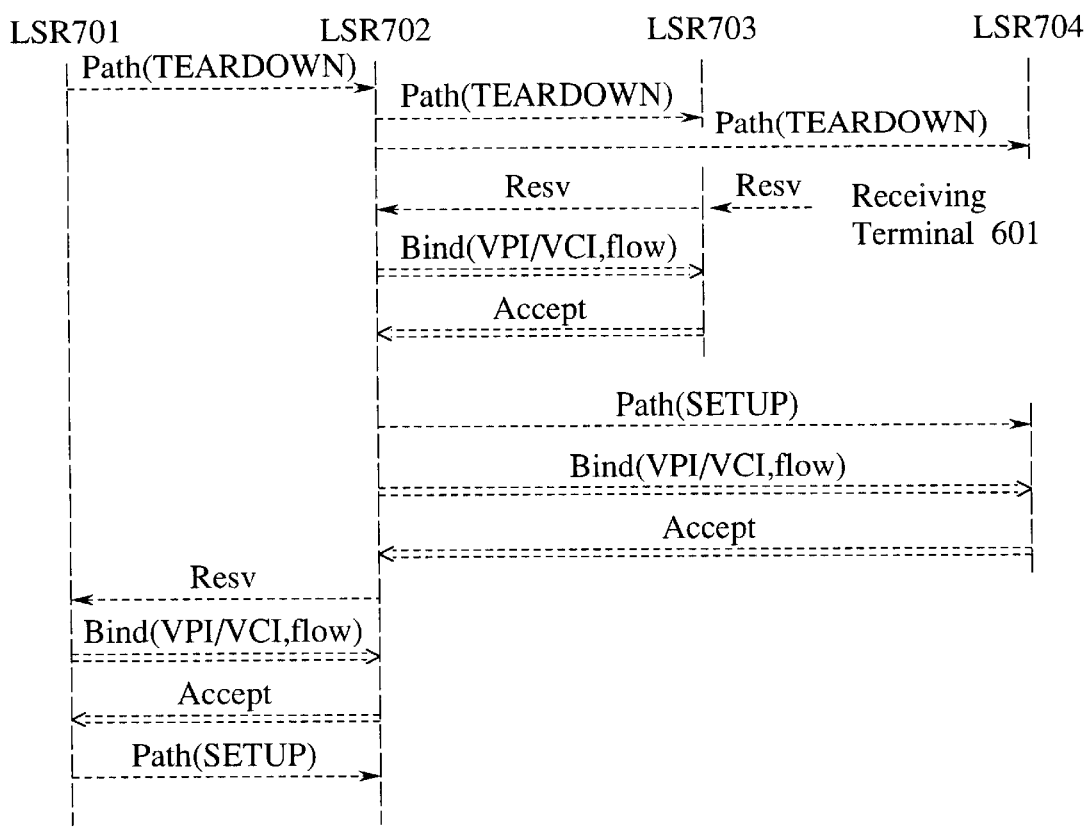
FIG. 11 is a sequence chart for a message sequence according to the second embodiment of the present invention in the case of using one VC set up protocol.

For example, it is possible to utilize a VC set up protocol in which each LSR sets up a VC with respect to the downstream LSR (that is, the upstream LSR allocates VPI/VCI with respect to the downstream LSR). When this VC set up protocol is adopted, the message sequence in the LSR network becomes as shown in FIG. 11.

Until the LSR 701 receives Resv message, Path message has the PATH_SETUP field value TEARDOWN. When the LSR 702 receives Resv message from the LSR 703, the VC set up protocol with respect to the LSR 703 is activated at this timing. First, the LSR 702 transmits to the LSR 703 Bind message indicating the correspondence between VPI/VCI to be set up and the flow to be transferred there. The LSR 703 returns Accept message when it is possible to accept the set up of such a VC. When the LSR 703 cannot set up a VC as specified by Bind message, the LSR 703 refuses the VC set up such that the VC set up between the LSR 702 and the LSR 703 fails.

When Accept message from the LSR 703 is received, the LSR 702 transmits Path message with the PATH_SETUP field value SETUP to the LSR 704 (in order to urge the VC set up to any existing downstream LSRs of the LSR 704), and also transmits Bind message to the LSR 704 in order to set up a VC with respect to the LSR 704. The LSR 704 returns Accept message to the LSR 70 when it is possible to accept the VC set up as specified by Bind message.

When the VC set up with respect to the LSR 703 and the LSR 704 succeeds, the LSR 702 transmits Resv message to the LSR 701. When this Resv message is received, the LSR 701 similarly transmits Bind message to the LSR 702 so as to set up a VC with respect to the LSR 702. When this VC set up succeeds, the LSR 701 changes the PATH_SETUP field value of Path message to be transmitted from TEARDOWN to SETUP.

Here, the VC on the route through which Resv message passes should preferably be satisfying the requested quality, so that the VC set up protocol may also require to describe the requested quality information in Bind message.

In this way, it becomes possible to set up a VC even on the route to which Resv message is not transferred, so that it becomes possible to carry out the cut-through transfer for the flow specified by RSVP using such a VC.

Figure 12:
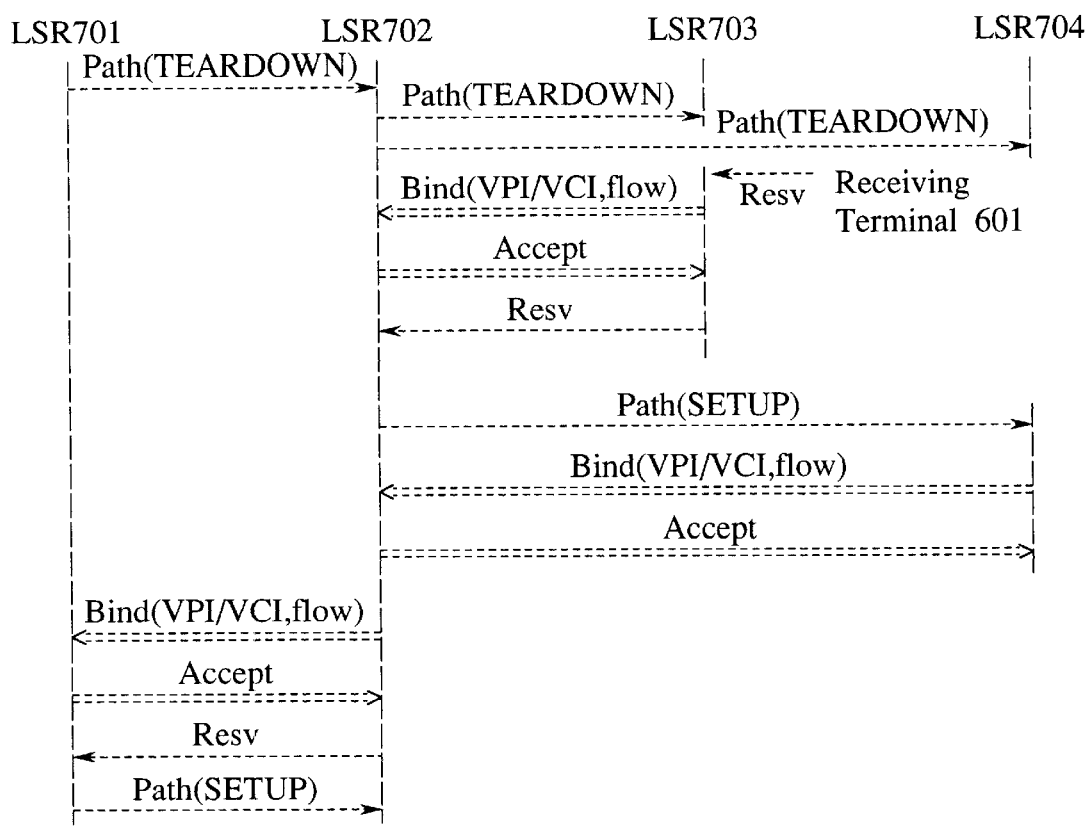
FIG. 12 is a sequence chart for a message sequence according to the second embodiment of the present invention in the case of using another VC set up protocol.

As another example, it is also possible to utilize a VC set up protocol in which each LSR sets up a VC with respect to the upstream LSR (that is, the downstream LSR allocates VPI/VCI with respect to the upstream LSR). When this VC set up protocol is adopted, the message sequence in the LSR network becomes as shown in FIG. 12.

Until the LSR 701 receives Resv message, Path message has the PATH_SETUP field value TEARDOWN. When the LSR 703 receives Resv message, the VC set up protocol with respect to the LSR 702 is activated at this timing. First, the LSR 703 transmits to the LSR 702 Bind message indicating the correspondence between VPI/VCI to be set up and the flow to be transferred there. The LSR 702 returns Accept message when it is possible to accept the set up of such a VC. When the LSR 702 cannot set up a VC as specified by Bind message, the LSR 702 refuses the VC set up such that the VC set up between the LSR 702 and the LSR 703 fails.

When Accept message from the LSR 702 is received, the LSR 703 transmits Resv message to the LSR 702. When Resv message is received, the LSR 702 transmits Path message with the PATH_SETUP field value SETUP to the LSR 704 (in order to urge the VC set up to any existing downstream LSRs of the LSR 704). When Path message with the PATH_SETUP field value SETUP is received, the LSR 704 transmits Bind message to the LSR 702 in order to set up a VC with respect to the LSR 702. The LSR 702 returns Accept message to the LSR 704 when it is possible to accept the VC set up as specified by Bind message.

In addition, the LSR 702 also transmits Bind message to the LSR 701 in order to set up a VC with respect to the LSR 701. The LSR 701 returns Accept message to the LSR 702 when it is possible to accept the VC set up as specified by Bind message. When Accept message from the LSR 701 is received, the LSR 702 transmits Resv message to the LSR 701. When this Resv message is received, the LSR 701 changes the PATH_SETUP field value of Path message to be transmitted from TEARDOWN to SETUP.

Here, the VC on the route through which Resv message passes should preferably be satisfying the requested quality, so that the VC set up protocol may also require to describe the requested quality information in Bind message.

In this way, it becomes possible to set up a VC even on the route to which Resv message is not transferred, so that it becomes possible to carry out the cut-through transfer for the flow specified by RSVP using such a VC.

Figure 13:
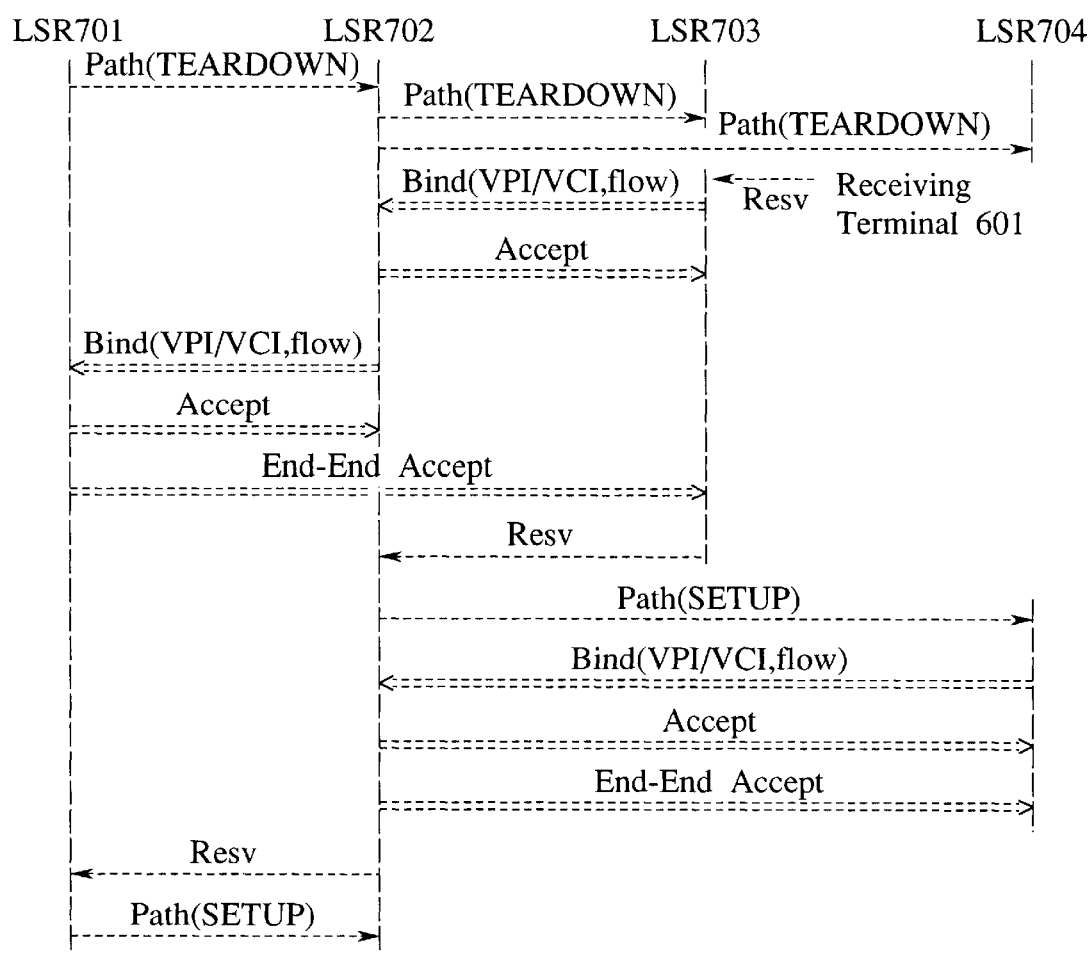
FIG. 13 is a sequence chart for a message sequence according to the second embodiment of the present invention in the case of using another VC set up protocol.

As another example, it is also possible to utilize a VC set up protocol in such a manner that an LSP (Label Switched Path) up to the ingress LSR is set up by the egress LSR on the downstream side. When this VC set up protocol is adopted, the message sequence in the LSR network becomes as shown in FIG. 13.

Until the LSR 701 receives Resv message. Path message has the PATH_SETUP field value TEARDOWN. When the LSR 703 receives Resv message, the protocol for setting up an LSP up to the ingress LSR is activated at this timing. First, the LSR 703 transmits to the LSR 702 Bind message indicating the correspondence between VPI/VCI to be set up and the flow to be transferred there. The LSR 702 returns Accept message when it is possible to accept the set up of such a VC. When the LSR 702 cannot set up a VC as specified by Bind message, the LSR 702 refuses the VC set up such that the VC set up between the LSR 702 and the LSR 703 fails.

When it is possible to accept the VC set up from the LSR 703, the LSR 702 also transmits Bind message to the LSR 701 in order to set up a VC with respect to the LSR 701. When it is possible to accept the set up of such a VC, the LSR 701 returns Accept message to the LSR 702. Then, the LSR 701 which is the ingress edge LSR also transmits End-End Accept message in order to notify the set up of an LSP up to the ingress LSR to the egress edge LSR 703. When End-End Accept message is received, the LSR 703 transmits Resv message to the LSR 702.

Note that an LSP to be set up here should preferably be satisfying the quality requested by RSVP, so that the requested quality information may be described in Bind message to be transmitted for the purpose of VC set up.

When Resv message is received, the LSR 702 transmits a Path message with the PATH_SETUP FIELD value SETUP to the LSR 704 in order to urge the VC set up to any existing downstream LSRs of the LSR 704. When Path message with the PATH_SETUP field value SETUP is received, the egress LSR 704 transmits Bind message to the LSR 702 in order to set up a VC with respect to the ingress edge LSR. At this point, if another LSR exists between the LSR 702 and the LSR 704, the PATH_SETUP field value of Path message will be ignored there. Also, an LSP to be set up to the ingress LSR by the LSR 704 should preferably be of a best effort quality. The LSR 702 returns Accept message to the LSR 704 when it is possible to accept the VC set up as specified by Bind message. In this case, the LSR 702 has already set up a VC to the upstream side, so that the LSR 702 transmits End-End Accept message to the LSR 704 without attempting any VC set up to the further upstream side.

In this way, it becomes possible to set up a VC even on the route to which Resv message is not transferred, so that it becomes possible to carry out the cut-through transfer for the flow specified by RSVP using such a VC.

Note that, in this example, a VC is set up from the downstream LSR to the upstream LSR between each LSR pair, but it is also possible to utilize the LSP set up protocol for setting up a VC from the upstream LSR to the downstream LSR between such LSR pair, as long as it is a protocol in which the egress edge LSR sets up an LSP up to the ingress edge LSR.

Next, the case where the LSRs are connected through a multi-access network will be described. The description of the second embodiment up to this point has been directed to the case where the LSRs are connected through point-to-point links. However, when the LSRs are connected through a multi-access link, it is still possible to apply the second embodiment as follows.

FIG. 4 shows a situation where LSRs 710 to 713 are connected to a single logical subnet (LIS: Logical IP Subnetwork) formed by an ATM network. While Path message with the PATH_SETUP field having a value TEARDOWN is received, the flows A, B and C are all transferred through a single VC 811 as shown in FIG. 4. Note that FIG. 4 is depicted as if the VC 811 is connected to all the nodes in the LIS, but it is preferable not to connect the VC 811 to those nodes for which there is no need to transfer the flows A, B and C.

The operation of the LSR 710 upon receiving Path message with the PATH_SETUP field having a value SETUP will now be described with reference to FIG. 5. Here, this Path message is assumed to be a message for the flow A. When Path message with the PATH_SETUP field having a value SETUP is received, the LSR 710 sets up a new VC 821 connected to next hop LSRs 711 to 713 to which the flow A should be transferred. At this point, the VC 821 should preferably be UBR-VC. When a VC 820 for transferring the flow A is set up from the upstream LSR, the LSR 710 registers an entry with 820 as the input VC and 821 as the output VC in the output VC search table so that it becomes possible to carry out the cut-through transfer. At this point, the reserved bandwidth field of that entry in the output VC search table is set equal to 0.

When the LSR 710 receives Resv message from the next hop LSR such as the LSR 711, the LSR 710 writes the bandwidth corresponding to the request bandwidth Flowspec that is written in that Resv message into the corresponding entry of the output VC search table, that is into the reserved bandwidth field of an entry with 820 as the input VC and 821 as the output VC. In this way, the bandwidth is reserved at a time of transfer of the flow A at the LSR 710. Then, Resv message is transmitted to the upstream node. At this point, it is preferable to change VC 821 to a VC with the better communication quality such as CBR-VC, for example.

Thus even when the LSRs are connected through a multi-access link, it is still possible to apply the second embodiment by using the multicast VC and carrying out the same processing as in the case of using point-to-point links.

Next, the case where there is no best effort cut-through VC will be described. The description of the first embodiment up to this point has been directed to the case where there exists a VC for transferring the flows A, B and C among the LSRs and the cut-through transfer using this VC is carried out for these flows. However, even when this VC does not exist, it is still possible to apply the second embodiment by newly setting up a VC for the flow A at the LSR which received Path message with the PATH_SETUP field having a value SETUP for the flow A.

Next, the case where the bandwidth reservation fails in a middle of the route will be described. When the set up of a VC with the reserved bandwidth upon receiving Resv message fails. ResvErr message with Err Code newly defined to indicate this fact written therein can be transmitted, and the LSR which received this ResvErr message can release the reserved bandwidth of the VC for transferring the corresponding flow, over a prescribed period of time such as while Resv messages are transmitted N times. In this way, it becomes possible to avoid reserving the bandwidth only at a part of the route when the bandwidth reservation fails in a middle of the route. In this case, the LSR that received this ResvErr message should preferably transmit ResvErr message after changing Err Code into a value specified in the RSVP specification. It is also possible to leave the reserved bandwidth of the VC for transferring the corresponding flow unchanged even when ResvErr message is received, and carry out the cut-through transfer using a VC (without reserved bandwidth) for that flow on the upstream side and a VC (with reserved bandwidth) on the downstream side.

Next, FIG. 6 shows an exemplary configuration of the LSR for realizing this second embodiment. In addition to the configuration of FIG. 1, this LSR of FIG. 6 has an RSVP processing unit 14 and a VC set up/release unit 16. Here, only the RSVP processing unit 14 and the VC set up/release unit 16 will be described.

When the received packet is an RSVP packet, there is no corresponding entry in the output VC search table, so that cells received at the ATM cell reception unit 2 are assembled into the IP packets at the packet assembling unit 6 and given to the RSVP processing unit 14.

The RSVP processing unit 14 processes the RSVP message, commands the VC set up/release unit 16 according to the message content as described above, reserves/releases the bandwidth of the communication resources such as switch within the own device, and updates the reserved bandwidth field of the corresponding entry in the output VC search table. Also, the content of Path message or RESV message is stored if necessary.

The VC set up/release unit 16 carries out the reservation/release of the bandwidth of the VC according to a command from the RSVP processing unit 14. Note that the change the communication quality for the VC, from UBR to CBR for example, can be realized by releasing a VC of UBR once and setting up a VC of CBR for that flow again.

Here, the case of using RSVP as a way of notifying the bandwidth reservation has been described, but the second embodiment is equally applicable to the case of using any other way of notifying the bandwidth reservation without using RSVP as long as it notifies a flow that has a possibility of requesting the bandwidth reservation (communication resource reservation or higher priority transfer) to the LSRs on the route of the flow, and essentially the same effects as described above can be realized even in such a case.

Note also that Path message is utilized here in order to notify the need for newly setting up a VC dedicated to that flow even to those nodes (LSRs) on the route to which Resv message from the receiving terminal is not transferred within the route of the target flow, but instead of that, it is also possible to define a separate protocol for commanding the set up of a DC dedicated to that flow from an LSR at which branching of the cut-through path occurs to those LSRs on the route to which Resv message is not transferred (or to the egress LSR connected to that receiving terminal).

As described, in this second embodiment, it is possible to choose the VC set up protocol from the downstream label allocation based protocol and the upstream label allocation based protocol, so that it is possible to provide an enhanced flexibility unavailable in the conventional proposals such as one disclosed in Viswanathan, et al., "Soft State Switching A Proposal to Extend RSVP for Switching RSVP flows", IETF draft <draft-viswanathan-mpls-rsvp-00.txt>, August 1997, which is applicable only to the upstream label allocation based protocol.

Third Embodiment

In the embodiment, when the bandwidth reservation is requested by RSVP, the bandwidth is reserved with respect to the VC for transferring the target flow instead of setting up a new VC for that flow, and then the priority control among RSVP flow and the other flows is carried out at a time of transferring the flow to that VC at the LSR.

In FIG. 8, when the receiving terminal 601 transmits Resv message for requesting the bandwidth reservation for the flow A in response to Path message for the flow A transmitted by the transmitting terminal 501, upon receiving this Resv message, the LSR 703 reserves the bandwidth for the flow A on the communication channel 102, and transmits Resv message to the LSR 702. Upon receiving this Resv message, the LSR 702 changes the reserved bandwidth field of the entry for the VC 802 that transfers the flow A in the output VC search table from 0 to a value corresponding to Flowspec at least, and transmits Resv message to the LSR 701. Upon receiving this Resv message, the LSR 701 gives packets belonging to the flow A at a rate at least by which the bandwidth is requested by RSVP, to the VC 801 through the IP processing unit, while packets belonging to the flow B and the flow C for which the bandwidth is not requested are transmitted to the VC 801 using the remaining bandwidth.

Then, at the LSR 702, cells that arrive from the VC 801 are copied and transferred to the VC 802 for which the necessary bandwidth is reserved (or through which cells are transferred at higher priority than the other VCs not shown in the figure) and the VC 803 for which the bandwidth is not reserved. Here, when the LSR 701 is carrying out the cut-through transfer from the upstream side VC (not shown) for the flows A, B and C to the VC 801, it is also possible to carry out the above described packet transfer without the processing at the IP processing unit, according to the priority levels written in the cell headers (which are given such values that cells of packets belonging to the flow A will be transferred at higher priority than cells of packets belonging to the flows B and C). Similarly, at the LSR 702, it is also possible to handle the flow A at higher priority than the flows B and C within the same VC, by transferring cells that arrive from the VC 801 according to the priority levels written in the cell headers.

Alternatively, in FIG. 8, in the case where the best effort quality VCs are set up between the LSRs 701 and 702, between the LSRs 702 and 703, and between the LSRs 702 and 704 before the receiving terminal 601 start transmitting Resv message for the flow A, and the flows A, B and C are transferred through the best effort quality LSP formed by these VCs, the VC is changed from the best effort quality one to a VC that can satisfy the requested quality of the flow A upon receiving Resv message. Here, the change of the VC quality implies charging the reserved bandwidth field of the entry for that VC in the output VC search table to a value corresponding to Flowspec indicated by Resv message, and changing the service category of the VC from UBR to CBR if necessary. In other words, when Resv message from the LSR 703 arrives at the LSR 702, the VC between the LSRs 702 and 703 is changed to a VC that satisfies the requested quality, and when this is successfully done, the LSR 702 transmits Resv message to the LSR 701. By repeating this operation, it is possible to set up an LSP that satisfies the requested quality of the flow A from the LSR 701 to the LSR 703.

Alternatively, in FIG. 8, in the case where the best effort quality LSP does not exist and the flow A is transferred by referring to the IP headers by the time the receiving terminal 801 starts transmitting Resv message, a VC that satisfies the requested quality of the flow A is set up upon receiving Resv message. In other words, when Resv message from the LSR 703 arrives at the LSR 702, a VC that satisfies the requested quality is set up as a VC between the LSRs 702 and 703, and when this is successfully done, the LSR 702 transmits Resv message to the LSR 701. By repeating this operation, it is possible to set up an LSP that satisfies the requested quality of the flow A from the LSR 701 to the LSR 703. In this case, between the LSR 702 and the LSR 704, the flows A, B and C can be transferred to the LSR 704 by copying the flows A, B and C and referring to the IP headers of these copied flows at a time of transferring the flows A, B and C to the LSR 703. It is also possible to carry out the cut-through transfer to the LSR 704 by newly setting up a VC of the best effort quality between the LSRs 702 and 704.

By the operation as described above, it is possible to reserve the bandwidth for the flow A on the route between the receiving terminal 601 which requested the bandwidth and the transmitting terminal 501, without setting up a VC for the flow A and therefore without requiring the VC merging.

Next, the case where the LSRs are connected through a multi-access network will be described. The description of the third embodiment up to this point has been directed to the case where the LSRs are connected through point-to-point links. However, when the LSRs are connected through a multi-access link, it is still possible to apply the third embodiment as follows.

FIG. 4 shows a situation where LSRs 710 and 713 are connected to a single logical subnet (LIS: Logical IP Subnetwork) formed by an ATM network. Before Resv message is received, the flows A, B and C are all transferred through a single VC 811 as shown in FIG. 4. Note that FIG. 4 is depicted as if the VC 811 is connected to all the nodes in the LIS, but it is preferable not to connect the VC 811 to those nodes for which there is no need to transfer the flows A, B and C.

When the LSR 710 receives Resv message from the next hop LSP such as the LSP 711, the LSR 710 writes the bandwidth corresponding to the request bandwidth Flowspec that is written in that Resv message into the corresponding entry of the output VC search table, that is into the reserved bandwidth field of an entry with 810 as the input VC and 811 as the output VC. In this way, the bandwidth is reserved at a time of transfer of the flow A at the LSR 710. Then, Resv message is transmitted to the upstream node. At this point, it is preferable to change VC 811 to a VC with the better communication quality such as CBR-VC, for example.

Thus even when the LSRs are connected to through a multi-access link, it is still possible to apply the third embodiment by using the multicast VC and carrying out the same processing as in the case of using point-to-point links.

Next, the case where there is no best effort cut-through VC will be described. The description of the first embodiment up to this point has been directed to the case where there exists a VC for transferring the flows A, B and C among the LSRs and the cut-through transfer using this VC is carried out for these flows. However, even when this VC does not exist, it is still possible to apply the third embodiment by newly setting up a VC for the flows A, B and C at the LSR which received Resv message for the flow A.

Next, FIG. 6 shows an exemplary configuration of the LSR for realizing this third embodiment. In addition to the configuration of FIG. 1, this LSR of FIG. 6 has an RSVP processing unit 14 for carrying out RSVP message processing and a VC set up/release unit 16 for carrying out VC set up/release.

When the received packet is an RSVP packet, there is no corresponding entry in the output VC search table, so that cells received at the ATM cell reception unit 2 are assembled into IP packets at the packet assembling unit 6 and given to the RSVP processing unit 14.

As described above, when Resv message for some flow is received, the RSVP processing unit 14 gives commands for realizing the priority control with respect to that flow, to the IP processing unit 10 in the case of the ingress or egress edge LSR of the LSR network (LSRs 701, 703 and 704 in FIG. 8) or to the ATM cell reception unit 2 and/or the ATM cell transmission unit 4 in the case of the other core LSR (LSR 702 in FIG. 8), and updates the reserved bandwidth field of the corresponding entry in the output VC search table. Also, the content of Path message or Resv message is stored if necessary.

The IP processing unit 10 of the edge LSR which received the above described command from the RSVP processing unit 14 will carry out the IP processing with respect to packets belonging to the flow specified by Resv message at higher priority.

The ATM cell reception unit 2 and/or the ATM cell transmission unit 4 of the core LSR which received the above described command from the RSVP processing unit 14 will carry out the priority control such as the higher priority transmission of cells belonging to the VC transferring the specified flow among cells stored in its internal buffer.

Here, the case of using RSVP as a way of notifying the bandwidth reservation has been described, but the third embodiment is equally applicable to the case of using any other way of notifying the bandwidth reservation (communication resource reservation or higher priority transfer), and essentially the same effects as described above can be realized even in such a case.

As described, in the first and second embodiments, at a time of transferring packets via nodes having a network layer processing function from the sender to a plurality of receivers, a VC for transferring the corresponding flow alone is set up on the route of that flow including a portion where the bandwidth reservation request is not made, according to some message to be used in the bandwidth reservation procedure such as Path message of RSVP, for example, and the cut-through transfer using this VC is carried out, so that it becomes possible to carry out the packet transfer without requiring the VC merging.

In addition, when the communication quality for some flow is requested using Resv message of RSVP, for example, from one of the plurality of receivers, the VC connected to the requesting receiver is set to provide the requested communication quality while the VCs connected to the other receivers are set to provide no guarantee of the communication quality, so that it becomes possible to provide the requested communication quality to the requesting receiver without wasting communication resources.

On the other hand, in the third embodiment, a VC is set up for each group of flows which share the same route, and the cut-through transfer using this VC is carried out (without separately setting up a VC dedicated to a flow for which the bandwidth reservation is requested), and the packet scheduling (priority control) is carried out by the LSR at the ingress point of the LSR network or the start point of the cut-through transfer such that the bandwidth of the flow for which the communication quality is requested can be guaranteed, so that it becomes possible to provide the requested communication quality to the specific flow without requiring the VC merging. In addition, it is possible to prevent an increase of the necessary number of VCs at this point.

As such, according to the present invention, when the communication quality for the flow to be cut-through transferred is requested, a virtual channel dedicated to that flow for which the communication resources are reserved is used, or the higher priority transfer for that flow is carried out instead of setting up a virtual channel dedicated to that flow, so that it is possible to realize the packet transfer for the flow for which the communication resources reservation or the higher priority transfer is requested, while needs inside the network carry out the cut-through transfer without using the virtual channel merging.

It is to be noted that, in the above described embodiments, at a time of setting up a VC between neighboring LSRs, a VC is set up between the upstream side LSR and the downstream side LSR at the initiative of the upstream side LSR which received a message for triggering the VC set up. However, the present invention is also applicable to the contrary case of adopting a protocol by which a VC is set up between the upstream side LSR and the downstream side LSR at the initiative of the downstream side LSR which received a message for triggering the VC set up.

It is also to be noted that the above described embodiments according to the present invention may be conveniently implemented in forms of software programs for realizing the operations of the communication control system, as will be apparent to those skilled in the computer art. Appropriate software coding can readily be prepared by skilled programmers based on the teachings of the present disclosure, as will be apparent to those skilled in the software art.

In particular, the LSR of each embodiment described above can be conveniently implemented in a form of a software package. Such a software program can be provided in a form of a computer program product which employs a storage medium including stored computer code which is used to program a computer to perform the disclosed function and process of the present invention. The storage medium may include, but is not limited to, any type of conventional floppy disks, optical disks, CD-ROMs, magneto-optical disks, ROMs, RAMs, EPROMs, EEPROMs, magnetic or optical cards, or any other suitable media for storing electronic instructions.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A method for transferring packets from a sender to a plurality of receivers via a network of nodes having a network layer processing function, the method comprising the steps of:

setting up at each node one or a plurality of virtual channels for a specific flow toward all of said plurality of receivers regardless of whether each receiver requested a communication quality for the specific flow or not, upon receiving a message used in a procedure for reserving the communication quality for the specific flow that is transmitted from an upstream side to a downstream side on a route of the specific flow toward said plurality of receivers;

storing at each intermediate node a correspondence between an upstream side virtual channel for the specific flow and one or a plurality of downstream side virtual channels for the specific flow; and transferring packets at each intermediate node by carrying out a transfer processing at a layer lower than a network layer according to the correspondence.

2. The method of claim 1, wherein the setting step sets up a virtual channel for the specific flow for which the communication quality is guaranteed, toward one receiver among said plurality of receivers who requested the communication quality for the specific flow, and other virtual channels for which the communication quality is not guaranteed, toward other receivers among said plurality of receivers, and the storing step stores the correspondence of an upstream side virtual channel for the specific flow with respect to downstream side virtual channels for which the communication quality is guaranteed and downstream side virtual channels for which the communication quality is not guaranteed.

3. The method of claim 1, further comprising the step of:

changing at each node one virtual channel for the specific flow toward one receiver who requested the communication quality for the specific flow such that the communication quality is guaranteed for said one virtual channel, upon receiving a message for requesting the communication quality that is transmitted from said one receiver to the sender toward the upstream side.

4. The method of claim 1, wherein when packets of a plurality of flows are to be transferred from the sender toward said plurality of receivers, the transferring step transfers packets belonging to the specific flow to the virtual channels for the specific flow set up by the setting step and packets belonging to other flows to other virtual channels.

5. A method for transferring packets from a sender to a plurality of receivers via a network of nodes having a network layer processing function, the method comprising the steps of:

setting up at each node one virtual channel for a specific flow toward at least one receiver among said plurality of receivers, and transmitting notification messages indicating a need to set up virtual channels for the specific flow toward other receivers on a downstream side of each node among said plurality of receivers, upon receiving a message for requesting a communication quality for the specific flow that is transmitted from said at least one receiver to the sender toward an upstream side, wherein a separate virtual channel set up procedure for setting up virtual channels for the specific flow toward the other receivers is activated among nodes on a route of the specific flow in response to the notification messages;

storing at each intermediate node a correspondence between an upstream side virtual channel for the specific flow and one or a plurality of downstream side virtual channels for the specific flow; and transferring packets at each intermediate node by carrying out a transfer processing at a layer lower than a network layer according to the correspondence.

6. The method of claim 5, wherein the setting step sets up said one virtual channel for the specific flow such that the communication quality is guaranteed for said one virtual channel, while the separate virtual channel set up procedure sets up other virtual channels for the specific flow toward the other receivers such that the communication quality is not guaranteed for the other virtual channels.

7. The method of claim 5, wherein when packets of a plurality of flows are to be transferred from the sender toward said plurality of receivers, the transferring step transfers packets belonging to the specific flow to the virtual channels for the specific flow set up by the setting step and packets belonging to other flows to other virtual channels.

8. The method of claim 5, wherein the separate virtual channel set up procedure is either an upstream allocation type in which a virtual channel between two neighboring nodes is set up by an initiative of an upstream side node, or a downstream allocation type in which a virtual channel between two neighboring nodes is set up by an initiative of a downstream side node.

9. A method for transferring packets from a sender to a plurality of receivers via a network of nodes having a network layer processing function, the method comprising the steps of:

setting up at each node virtual channels toward said plurality of receivers that can be shared by a plurality of flows;

outputting packets to the virtual channels at a node for transferring packets by a transfer processing at a network layer, wherein when a communication quality for one flow among said plurality of flows is requested by one receiver among said plurality of receivers, packets belonging to said one flow are outputted to the virtual channels at higher priority than packets belonging to other flows among said plurality of flows;

storing at each intermediate node a correspondence between an upstream side virtual channel that can be shared by said plurality of flows and one or a plurality of downstream side virtual channels that can be shared by said plurality of flows; and transferring packets at each intermediate node by carrying out a transfer processing at a layer lower than a network layer according to the correspondence.

10. The method of claim 9, further comprising the step of:

changing at each node one virtual channel toward said one receiver among the virtual channels such that the communication quality is guaranteed for said one virtual channel, upon receiving a message for requesting the communication quality that is transmitted from said one receiver to the sender toward the upstream side.

11. A node device on a route for transferring packets from a sender to a plurality of receivers, comprising:

a processing unit for applying a network layer processing to packets;

a virtual channel set up unit for setting up one or a plurality of virtual channels for a specific flow, toward all of said plurality of receivers regardless of whether each receiver requested a communication quality for the specific flow or not, upon receiving a message used in a procedure for reserving the communication quality for the specific flow that is transmitted from an upstream side to a downstream side on a route of the specific flow toward said plurality of receivers;

a memory for storing a correspondence between an upstream side virtual channel for the specific flow and one or a plurality of downstream side virtual channels for the specific flow; and a transfer unit for transferring packets by carrying out a transfer processing at a layer lower than a network layer according to the correspondence.

12. The node device of claim 11, wherein the virtual channel set up unit sets up a virtual channel for the specific flow for which the communication quality is guaranteed, toward one receiver among said plurality of receivers who requested the communication quality for the specific flow, and other virtual channels for which the communication quality is not guaranteed, toward other receivers among said plurality of receivers, and the memory stores the correspondence of an upstream side virtual channel for the specific flow with respect to downstream side virtual channels for which the communication quality is guaranteed and downstream side virtual channels for which the communication quality is not guaranteed.

13. The node device of claim 11, wherein the virtual channel set up unit also changes one virtual channel for the specific flow toward one receiver who requested the communication quality for the specific flow such that the communication quality is guaranteed for said one virtual channel, upon receiving a message for requesting the communication quality that is transmitted from said one receiver to the sender toward the upstream side.

14. The node device of claim 11, wherein when packets of a plurality of flows are to be transferred from the sender toward said plurality of receivers, the transfer unit transfers packets belonging to the specific flow to the virtual channels for the specific flow set up by the virtual channel set up unit and packets belonging to other flows to other virtual channels.

15. A node device on a route for transferring packets from a sender to a plurality of receivers, comprising:

a processing unit for applying a network layer processing to packets;

a virtual channel set up unit for setting up one virtual channel for a specific flow toward at least one receiver among said plurality of receivers, and transmitting notification messages indicating a need to set up virtual channels for the specific flow toward other receivers on a downstream side of the node device among said plurality of receivers, upon receiving a message for requesting a communication quality for the specific flow that is transmitted from said at least one receiver to the sender toward an upstream side, wherein a separate virtual channel set up procedure for setting up virtual channels for the specific flow toward the other receivers is activated among nodes on a route of the specific flow in response to the notification messages;

a memory for storing a correspondence between an upstream side virtual channel for the specific flow and one or a plurality of downstream side virtual channels for the specific flow; and a transfer unit for transferring packets by carrying out a transfer processing at a layer lower than a network layer according to the correspondence.

16. The node device of claim 15, wherein the virtual channel set up unit sets up said one virtual channel for the specific flow such that the communication quality is guaranteed for said one virtual channel, while the separate virtual channel set up procedure sets up other virtual channels for the specific flow toward the other receivers such that the communication quality is not guaranteed for the other virtual channels.

17. The node device of claim 15, wherein when packets of a plurality of flows are to be transferred from the sender toward said plurality of receivers, the transfer unit transfers packets belonging to the specific flow to the virtual channels for the specific flow set up by the virtual channel set up unit and packets belonging to other flows to other virtual channels.

18. The node device of claim 15, wherein the notification messages cause an activation of the separate virtual channel set up procedure which is either an upstream allocation type in which a virtual channel between two neighboring nodes is set up by an initiative of an upstream side node, or a downstream allocation type in which a virtual channel between two neighboring nodes is set up by an initiative of a downstream side node.

19. A network of nodes for transferring packets from a sender to a plurality of receivers, each node having a processing unit for applying a network layer processing to packets and a virtual channel set up unit for setting up virtual channels toward said plurality of receivers that can be shared by a plurality of flows, and the network including:

an edge node for transferring packets by a transfer processing at a network layer, wherein when a communication quality for one flow among said plurality of flows is requested by one receiver among said plurality of receivers, packets belonging to said one flow are outputted to the virtual channels at higher priority than packets belonging to other flows among said plurality of flows; and at least one intermediate node having a memory for storing a correspondence between an upstream side virtual channel that can be shared by said plurality of flows and one or a plurality of downstream side virtual channels that can be shared by said plurality of flows, and a transfer unit for transferring packets by carrying out a transfer processing at a layer lower than a network layer according to the correspondence.

20. The network of claim 19, wherein each node also changes one virtual channel toward said one receiver among the virtual channels such that the communication quality is guaranteed for said one virtual channel, upon receiving a message for requesting the communication quality that is transmitted from said one receiver to the sender toward the upstream side.

* * * * *